US011451674B2

(12) United States Patent
Igarashi

(10) Patent No.: US 11,451,674 B2
(45) Date of Patent: Sep. 20, 2022

(54) PRINTING SYSTEM, CONTROL METHOD THEREOF, AND STORAGE MEDIUM FOR VERIFYING PRINT RESULTS IN A PLURALITY OF SHEET DISCHARGED DESTINATIONS OF DIFFERENT TYPE

(71) Applicant: CANON KABUSHIKI KAISHA, Tokyo (JP)

(72) Inventor: Hiroya Igarashi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/355,372

(22) Filed: Jun. 23, 2021

(65) Prior Publication Data

US 2021/0409551 A1 Dec. 30, 2021

(30) Foreign Application Priority Data

Jun. 29, 2020 (JP) ............................ JP2020-111727

(51) Int. Cl.
*G06F 3/12* (2006.01)
*H04N 1/00* (2006.01)

(52) U.S. Cl.
CPC ..... *H04N 1/00045* (2013.01); *H04N 1/00005* (2013.01); *H04N 1/0009* (2013.01); *H04N 1/00641* (2013.01); *H04N 1/00801* (2013.01)

(58) Field of Classification Search
CPC .......... H04N 1/00045; H04N 1/00005; H04N 1/0009; H04N 1/00641; H04N 1/00801
USPC .................................................. 358/1.1–1.18
See application file for complete search history.

(56) References Cited

U.S. PATENT DOCUMENTS

| | | | | |
|---|---|---|---|---|
| 10,848,639 | B2 | 11/2020 | Iida et al. | |
| 2005/0046889 | A1 * | 3/2005 | Braudaway | G06K 17/00 358/1.14 |
| 2013/0223866 | A1 | 8/2013 | Kazama et al. | |
| 2016/0277612 | A1 * | 9/2016 | Kubo | H04N 1/121 |
| 2020/0314274 | A1 * | 10/2020 | Hasegawa | H04N 1/00079 |
| 2021/0072933 | A1 * | 3/2021 | Yasaki | G06F 3/1208 |
| 2021/0303844 | A1 * | 9/2021 | Goda | B41F 33/0036 |

FOREIGN PATENT DOCUMENTS

| | | |
|---|---|---|
| JP | 2013-171570 A | 9/2013 |

* cited by examiner

*Primary Examiner* — Gabriel I Garcia
(74) *Attorney, Agent, or Firm* — Venable LLP

(57) ABSTRACT

In a system that verifies a print detect in a printed sheet, inconsistency between the sheet side at the time of reference image registration and that at the time of verification processing is prevented from occurring without imposing complicated work on a user. An image on a sample sheet is registered in advance as a reference image in association with the sheet side and at the same time, the sheet discharge setting for the sample sheet is stored. Verification is performed by matching the sheet side associated with the reference image and the verification-target side of the printed sheet based on the sheet discharge setting stored as a sheet discharge setting in the print processing.

10 Claims, 19 Drawing Sheets

PRINTING SYSTEM, CONTROL METHOD THEREOF, AND STORAGE MEDIUM FOR VERIFYING PRINT RESULTS IN A PLURALITY OF SHEET DISCHARGED DESTINATIONS OF DIFFERENT TYPE

BACKGROUND OF THE INVENTION

Field of the Invention

The present disclosure relates to a verification technique of print results.

Description of the Related Art

Conventionally, there is a printing system of inline type that incorporates a verification device capable of printing and outputting while verifying print results. In the printing system such as this, the presence/absence of a print defect is determined by comparing an image as evaluation reference (reference image) registered for collation and an image (read image) obtained by optically reading a printed material. Then, Japanese Patent Laid-Open No. 2013-171570 has disclosed a verification method that takes into consideration the printing setting, such as multi-page printing, one-sided printing, and doubled-sided printing, in order to establish consistency of the page order between the reference image and the read image.

In a case where a printing system comprises a plurality of sheet discharge destinations of different types, it may become necessary to set again the image side to be read in the verification device in accordance with the sheet discharge destination to be used. In this regard, registering a reference image by taking into consideration the image side to be read for each sheet discharge destination and performing various settings by taking into consideration the conveyance path within the verification device to perform printing is complicated and difficult work for an operator of printing. Further, Japanese Patent Laid-Open No. 2013-171570 does not suppose the case such as this, and therefore, it is not possible to appropriately control the image side to be read in accordance with the sheet discharge destination to be used or the like.

SUMMARY OF THE INVENTION

The printing system according to the present disclosure is a printing system capable of verifying, based on a read image of a printed sheet for which print processing has been performed, a print defect in the printed sheet, the printing system including: a reading unit configured to read an image on a sheet; a registration unit configured to register an image on a sheet to be taken as a sample sheet read by the reading unit as a reference image in the verification; a storage unit configured to store a sheet discharge setting for the sample sheet; and a verification unit configured to verify, using the reference image registered in the registration unit, an image on the printed sheet by acquiring a sheet discharge setting in the print processing and based on the acquired sheet discharge setting and a sheet discharge setting stored in the storage unit, and the registration unit registers the reference image in association with a sheet side indicating one of an obverse side and a reverse side and the verification unit performs the verification by matching the sheet side associated with the reference image and a verification-target side of the printed sheet.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration>

Figure 1:
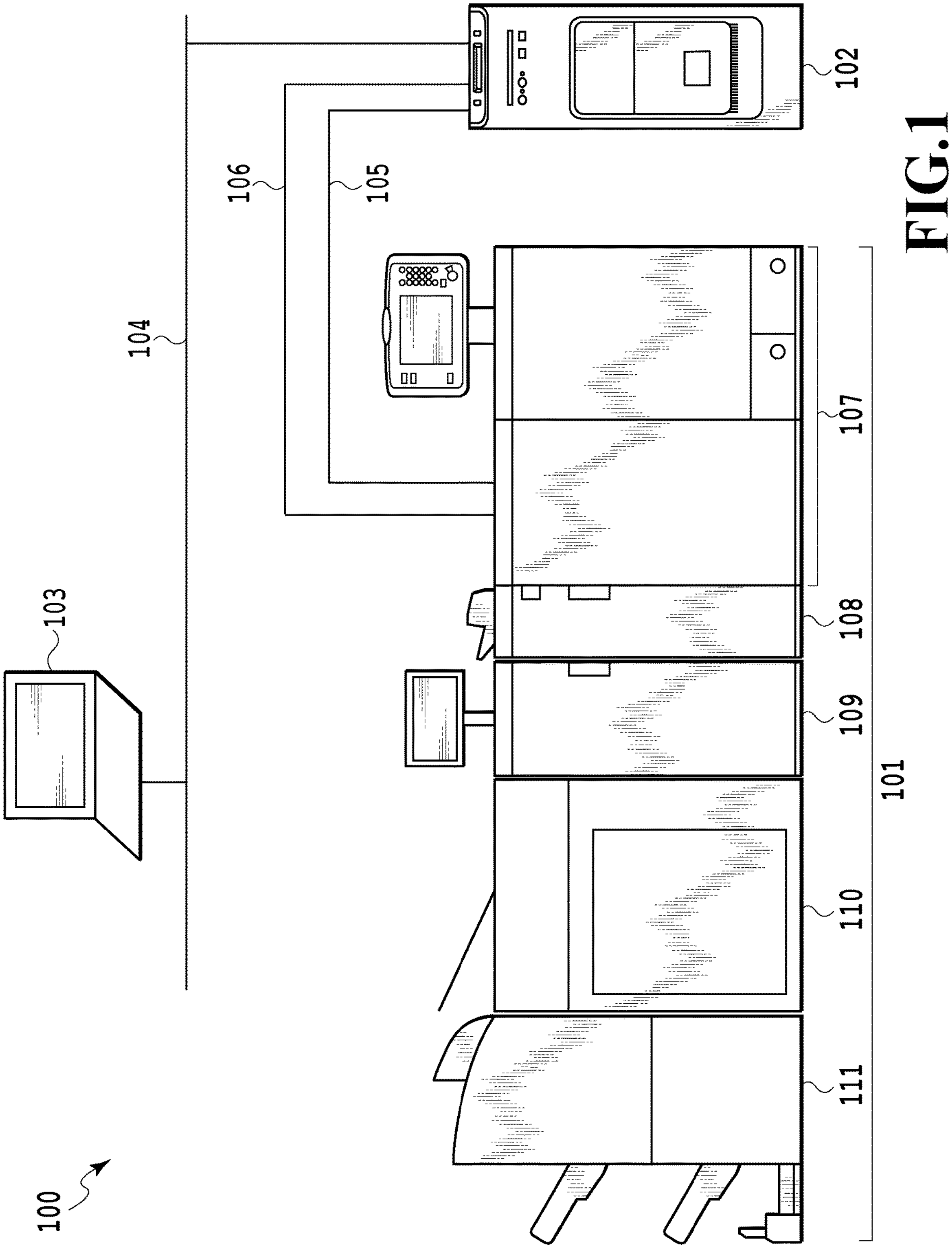
FIG. 1 is a diagram showing an example of a configuration of a printing system.

FIG. 1 is a diagram showing an example of the configuration of a printing system according to the present embodiment. A printing system 100 comprises an image forming apparatus 101 and an external controller 102. The image forming apparatus 101 and the external controller 102 are connected so as to be capable of communication via an internal LAN 105 and a video cable 106. Further, the external controller 102 is connected with a client PC 103 so as to be capable of communication via an external LAN 104.

In the client PC 103, a printer driver having a function to convert print processing-target image data into a page description language (PDL) that the external controller 102 can process is installed. It is possible for a user who desires to perform printing to give printing instructions from various applications via the printer driver. The printer driver transmits PDL data to the external controller 102 based on printing instructions from a user. Upon receipt of PDL data from the PC 103, the external controller 102 generates print data (in the following, called "print job"), which the image forming apparatus 101 can process, by performing PDL analysis and rasterize processing and inputs the print job to the image forming apparatus 101.

Next, the image forming apparatus 101 is explained. The image forming apparatus 101 comprises a printing module 107, an inserter 108, a verification module 109, a stacker 110, and a finisher 111. In the following, each module is explained.

The printing module 107 forms an image using toner as a printing material for a sheet as a printing medium conveyed from a sheet feed unit 230 in accordance with a print job. The configuration and the operation principle of the printing module 107 are as follows. The laser light modulated in accordance with an image designated in a print job is reflected by a polygon mirror or the like and a photoconductor drum is irradiated with the laser light as scanning light. An electrostatic latent image formed on the photoconductor drum by the laser light is developed by toner and a toner image is transferred onto a sheet pasted onto a transfer drum. By performing this series of image forming processes sequentially for the toner of each of yellow (Y), magenta (M), cyan (C), and black (K), a full-color image is formed on the sheet. The sheet on the transfer drum, on which the full-color image is formed, is conveyed to a fixing unit. The fixing unit includes a roller, a belt and the like and internally includes a heat source, such as a halogen heater, within the roller, and dissolves the toner on the sheet on which the full-color image is formed by applying heat and pressure and fixes the toner onto the sheet.

The inserter 108 is a device that inserts a partition sheet or the like for separating a sheet group conveyed after being subjected to the print processing in the printing module 107 at, for example, an arbitrary position.

The verification module 109 determines whether the image formed on the sheet is normal, that is, determines the presence/absence of a print defect by reading the image on the conveyed printed sheet and comparing the image with a reference image registered in advance.

The stacker 110 is a large-capacity stacking device capable of stacking printed sheets. The finisher 111 is a postprocessing device having various finishing processing functions, such as stapling, punching, and saddle stitching bookbinding. The finisher 111 performs finishing processing selected and set in advance for the conveyed printed sheet. The sheet after the finishing processing is performed is discharged onto a sheet discharge tray.

The printing system explained in FIG. 1 has the configuration in which a print job is input via the external controller 102, but for example, a configuration that omits the external controller 102 is also possible. That is, the configuration may also be one in which the image forming apparatus 101 is connected to the external LAN 104 and PDL data is transmitted from the client PC 103 to the image forming apparatus 101. In this case, after a print job is generated by performing PDL analysis and rasterize processing in the image forming apparatus 101, print processing is performed. Further, in the example in FIG. 1, the external controller 102 and the image forming apparatus 101 are connected by the internal LAN 105 and the video cable 106, but any configuration may be accepted as long as it is possible to perform transmission and reception of data necessary for printing. For example, the external controller 102 and the image forming apparatus 101 may be connected by only one of the internal LAN 105 and the video cable 106.

<Internal Configuration of Printing System>

Figure 2:
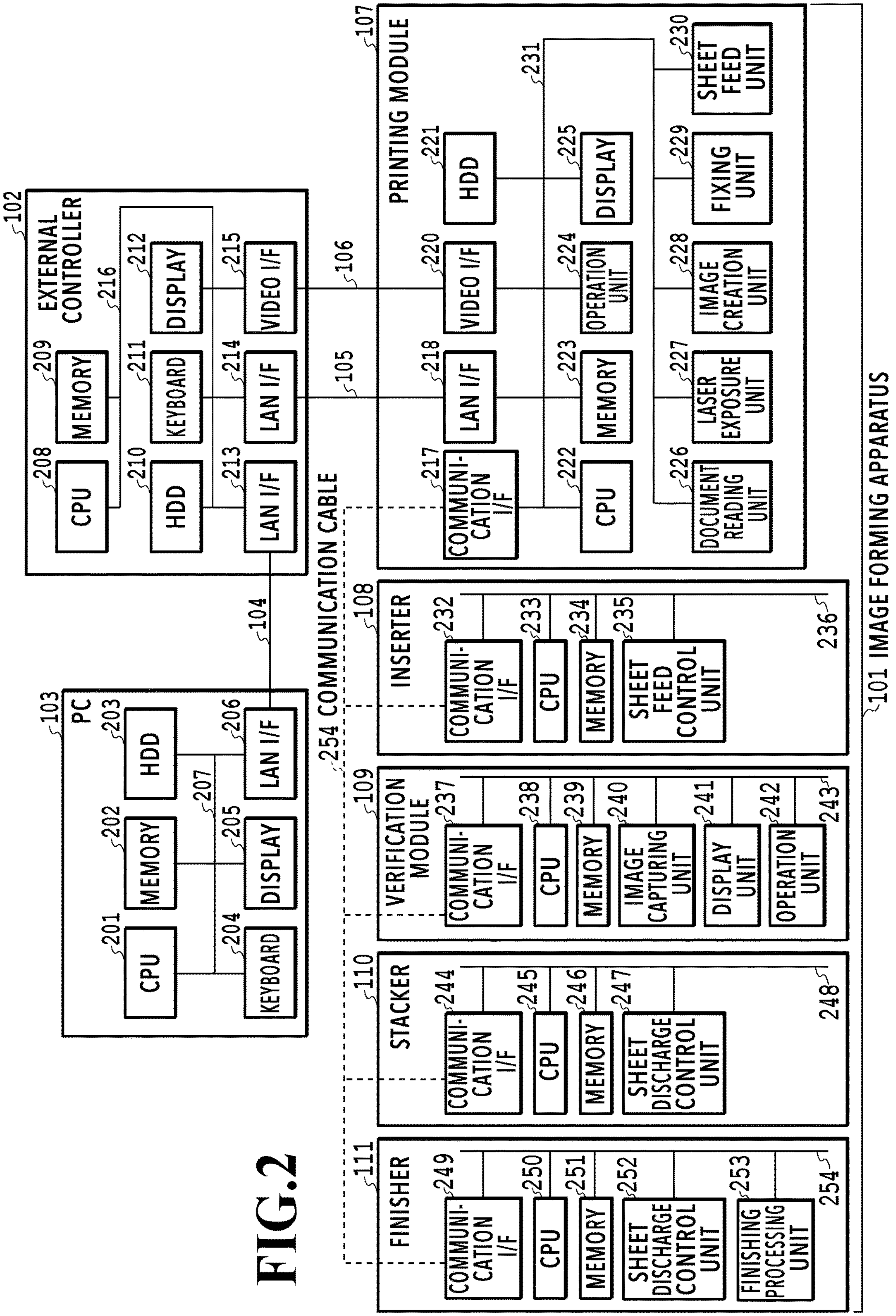
FIG. 2 is a block diagram showing an internal configuration of an image forming apparatus, an external controller, and a client PC, configuring the printing system.

FIG. 2 is a block diagram showing the internal configuration of the image forming apparatus 101, the external controller 102, and the client PC 103, configuring the printing system 100. In the following, explanation is given in order.

<<Internal Configuration of Image Forming Apparatus>>

First, the internal configuration of the printing module 107 of the image forming apparatus 101 is explained. The printing module 107 has, as components relating mainly to control, a communication I/F 217, a LAN I/F 218, a video I/F 220, an HDD 221, a CPU 222, a memory 223, an operation unit 224, and a display 225. Further, the printing module 107 has, as components relating mainly to image formation, a document reading unit 226, a laser exposure unit 227, an image creation unit 228, a fixing unit 229, and the sheet feed unit 230. Each component is connected via a system bus 231. The communication I/F 217 is connected with the inserter 108, the verification module 109, the stacker 110, and the finisher 111 via a communication cable 254 and communication is performed for controlling each device. The LAN I/F 218 is connected with the external controller 102 via the internal LAN 105 and communication of print data and the like is performed. The video I/F 220 is connected with the external controller 102 via the video cable 106 and communication of image data and the like is performed. The HDD 221 is a storage device in which programs and data are stored. The CPU 222 centralizedly controls the printing module 107 based on programs and the like stored in the HDD 221. In the memory 223, programs and image data that are necessary at the time of the CPU 222 performing various kinds of processing and the memory 223 operates as a work area. The operation unit 224 receives inputs of various settings and operation instructions from a user. The display 225 displays information on various settings relating to print processing, the processing status of a print job, and the like. The document reading unit 226 is a scanner device that optically reads a document at the time of using the copy function and the scan function. The document reading unit 226 optically reads an image on a document by capturing the image with a CCD camera while illuminating the sheet placed by a user with an exposure lamp and generates image data. The laser exposure unit 227 is a device that performs primary charging and laser exposure for irradiation of laser light. The laser exposure unit 227 first performs primary charging that charges the photoconductor drum surface to a uniform minus potential. Next, the laser exposure unit 227 irradiates the photoconductor drum with the laser light by a laser driver while adjusting the reflection angle with a polygon mirror. Due to this, the minus charges at the irradiated portion are neutralized and an electrostatic latent image is formed. The image creation unit 228 is a device for transferring toner onto the sheet. The image creation unit 228 includes a developing unit, a transfer unit, a toner replenishment unit and the like, which are not shown schematically, and transfers the toner on the photoconductor drum onto the sheet. The development unit fixes the toner changed minus from a development cylinder to the electrostatic latent image on the photoconductor drum surface and visualizes the electrostatic latent image. The transfer unit performs first transfer that transfers the toner on the photoconductor drum surface onto a transfer belt by applying a plus potential to a primary transfer roller and a secondary transfer that transfers the toner on the transfer belt onto the sheet by applying a plus potential to a secondary transfer roller. The fixing unit 229 is a device that fuses and fixes the toner on the sheet onto the sheet by applying heat and pressure and includes a heating heater, a fixing belt, a pressure belt and the like, which are not shown schematically. The sheet feed unit 230 is a device for feeding a sheet that is provided for print processing. The sheet feed unit 230 performs the sheet feed operation and the conveyance operation by a roller and various sensors, which are not shown schematically.

Next, the internal configuration of the inserter 108 of the image forming apparatus 101 is explained. The inserter 108 includes a communication I/F 232, a CPU 233, a memory 234, and a sheet feed control unit 235 and each component is connected via a system bus 236. The communication I/F 232 is connected with the printing module 107 via the communication cable 254 and performs communication necessary for sheet insertion control. The CPU 233 controls the entire inserter 108 in accordance with control programs stored in the memory 234. The memory 234 is a storage device in which control programs are stored. The sheet feed control unit 235 controls the intake of a sheet placed on a tray 321, the sheet feed from a sheet feed unit, not shown schematically, and the conveyance of a sheet conveyed from the printing module 107 while controlling a roller and a sensor, which are not shown schematically, based on instructions from the CPU 233.

Next, the internal configuration of the verification module 109 of the image forming apparatus 101 is explained. The verification module 109 includes a communication I/F 237, a CPU 238, a memory 239, an image capturing unit 240, a display unit 241, and an operation unit 242 and each component is connected via a system bus 243. The communication I/F 237 is connected with the printing module 107 via the communication cable 254 and performs communication necessary for control, such as verification of a printed sheet. The CPU 238 controls the entire verification module 109 in accordance with control programs stored in the memory 239. The memory 239 is a storage device that stores various kinds of setting information and image data, in addition to control programs. The image capturing unit 240 reads the image on a printed sheet that is conveyed by image capturing based on instructions of the CPU 238. In the present embodiment, the image on a sheet is read by performing image capturing with a camera, but for example, it may also be possible to read the image with an inline scanner or the like. The CPU 238 compares the verification-target captured image obtained by the image capturing unit 240 and the reference image stored in advance in the memory 239 and determines whether there is a defect in the print results. On the display unit 241, the verification results, the setting screen and the like are displayed. The operation unit 242 is operated by a user and receives instructions to change the setting of the verification module 109, to register a reference image, and so on.

Next, the internal configuration of the stacker 110 of the image forming apparatus 101 is explained. The stacker 110 includes a communication I/F 244, a CPU 245, a memory 246, and a sheet discharge control unit 247 and each component is connected via a system bus 248. The communication I/F 244 is connected with the printing module 107 via the communication cable 254 and performs communication necessary for sheet stacking and sheet discharge control. The CPU 245 controls the entire stacker 110 in accordance with control programs stored in the memory 246. The memory 246 is a storage device in which control programs are stored. The sheet discharge control unit 247 performs control for conveying a conveyed sheet to a stack tray, an escape tray, or the subsequent finisher 111 based on instructions from the CPU 245.

Next, the internal configuration of the finisher 111 of the image forming apparatus 101 is explained. The finisher 111 includes a communication I/F 249, a CPU 250, a memory, 251, a sheet discharge control unit 252, and a finishing processing unit 253 and each component is connected via a system bus 254. The communication OF 249 is connected with the printing module 107 via the communication cable 254 and performs communication necessary for control of the finishing processing. The CPU 250 controls the entire finisher 111 in accordance with control programs stored in the memory 251. The memory 251 is a storage device in which control programs are stored. The sheet discharge control unit 252 controls sheet conveyance and sheet discharge based on instructions from the CPU 250. The finishing processing unit 253 performs processing, such as stapling, punching, and saddle stitching bookbinding, based on instructions from the CPU 250.

<<Internal Configuration of External Controller>>

Next, the internal configuration of the external controller 102 is explained. The external controller 102 includes a CPU 208, a memory 209, an HDD 210, a keyboard 211, a display 212, a LAN I/F 213, a LAN I/F 214, and a video IF 215 and each component is connected via a system bus 216. The CPU 208 performs processing, such as reception of PDL data from the client PC 103, RIP processing, and transmission of a print job to the image forming apparatus 101, based on programs and data stored in the HDD 210. The memory 209 stores programs and data necessary at the time of the CPU 208 performing various kinds of processing and operates as a work area. The HDD 210 stores programs and data necessary for the operation, such as PDL analysis and RIP processing. The keyboard 211 is an input device for a user to input various operations and instructions to the external controller 102. On the display 212, information on an application being executed by the external controller 102 and the like is displayed in a still image or in a moving image. The LAN I/F 213 is connected with the client PC 103 via the external LAN 104 and reception of PDL data and the like are performed. The LAN I/F 214 is connected with the image forming apparatus 101 via the internal LAN 105 and transmission of a print job and the like are performed. The video I/F 215 is connected with the image forming apparatus 101 via the video cable 106 and transmission and reception of image data and the like are performed.

<<Internal Configuration of Client PC>>

Next, the internal configuration of the client PC 103 is explained. The client PC 103 includes a CPU 201, a memory 202, an HDD 203, a keyboard 204, a display 205, and a LAN I/F 206 and each component is connected via a system bus 207. The CPU 201 creates image data that is the print processing target and gives printing instructions based on a document creation program or the like stored in the HDD 203. Further, the CPU 201 comprehensively controls each device connected to the system bus 207. The memory 202 stores programs and data necessary at the time of the CPU 201 performing various kinds of processing and operates as a work area. The HDD 203 stores programs and data necessary for the operation, such as print processing. The keyboard 204 is an input device for a user to input various operations and instructions to the client PC 103. On the display 205, information on an application or the like being executed by the client PC 103 is displayed in a still image or in a moving image. The LAN I/F 206 is connected with the external LAN 104 and transmission of PDL data and the like are performed.

Each of the memory 202, the memory 209, the memory 223, the memory 234, the memory 239, the memory 246, and the memory 251 shown in FIG. 2 is only required to be a storage device for storing data and programs. For example, the configuration of the memory may be one replaced with a volatile RAM, a nonvolatile ROM, a built-in HDD, an external HDD, a USB memory or the like.

<Conveyance System of Image Forming Apparatus>

Figure 3:
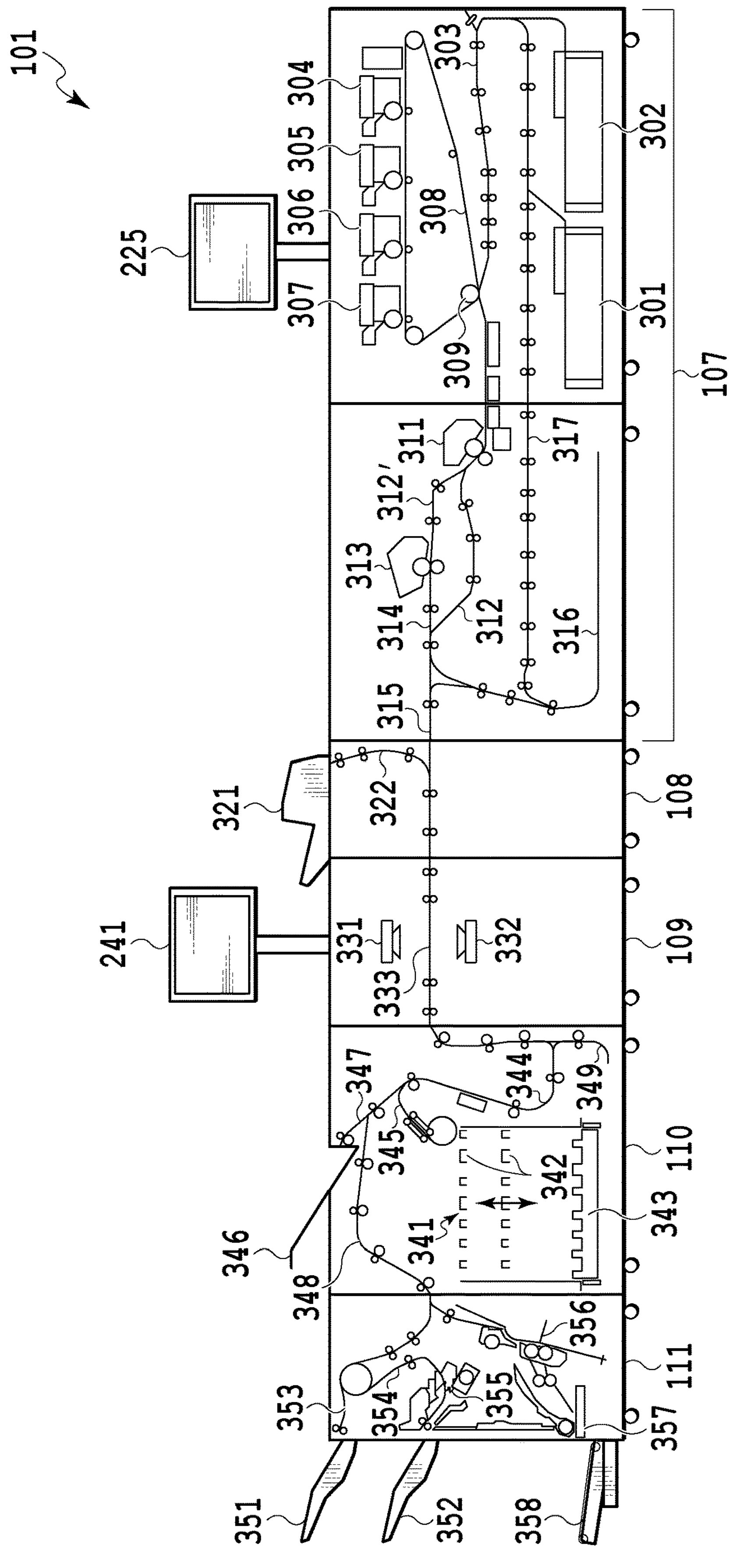
FIG. 3 is a cross-sectional diagram of a mechanism of the image forming apparatus.

Following the above, the conveyance system of the image forming apparatus 101 is explained. FIG. 3 is a cross-sectional diagram of the mechanism of the image forming apparatus 101. In the following, explanation is given along FIG. 3.

The printing module 107 comprises sheet feed decks 301 and 302. It is possible to store various sheets in each of the sheet feed decks 301 and 302. The sheet feed decks 301 and 302 separate only one sheet located at the uppermost position of the stored sheets and convey the sheet to a sheet conveyance path 303. Each of development stations 304 to 307 forms a toner image by using colored toner of Y, M, C, or K. The formed toner image is first transferred primarily onto an intermediate transfer belt 308. Then, the intermediate transfer belt 308 rotates clockwise in FIG. 3 and at a secondary transfer position 309, the toner image is transferred onto the sheet conveyed from the sheet conveyance path 303. On the display device 225, the processing status of a print job and information for various settings are displayed. A fixing unit 311 comprises a pressure roller and a heat roller and fixes the toner image onto the sheet by causing the sheet to pass between each roller to fuse and fix the toner. The sheet that exits the fixing unit 311 is conveyed to a sheet conveyance path 315 through a sheet conveyance path 312. In a case where the sheet is a sheet type that further requires fusion and fixing to fix the toner image, after passing through the fixing unit 311, the sheet is conveyed to a second fixing unit 313 through a sheet conveyance path 312' located above the sheet conveyance path 312. The sheet for which additional fusion and fixing have been performed in the secondary fixing unit 313 is conveyed to the sheet conveyance path 315 through a sheet conveyance path 314. Here, in a case where the setting of the print mode is set to double-sided printing, the sheet is conveyed to a sheet reversing path 316 and after being reversed, the sheet is conveyed to a double-sided conveyance path 317. Then, at the secondary transfer position 309, image transfer onto the second side is performed.

In a case where the number of sheets that are conveyed to the inserter 108 through the sheet conveyance path 315 reaches a predetermined number of sheets, the inserter 108 merges a partition sheet fed through a sheet conveyance path 322 with the conveyance path. Due to this, it is made possible to insert the partition sheet into a series of sheet groups conveyed from the printing module 107 at arbitrary timing and convey them to the subsequent device. The sheet having passed through the inserter 108 is conveyed to the verification module 109. Within the verification module 109, a first camera 331 and a second camera 332 are arranged so as to face each other. The first camera 331 captures the facing-up side of the sheet and second camera 332 captures the facing-down side of the sheet. The verification module 109 reads both sides of the sheet by using the first camera 331 and the second camera 332 at the timing at which the sheet conveyed to a sheet conveyance path 333 reaches a predetermined position and verifies whether there is a defect in the read image of the verification-target side. On the display device 241, results of the verification performed by the verification module 109, and the like are displayed. The verified sheet is conveyed to the stacker 110.

The stacker 110 has a stack tray 341 for stacking sheets. The sheet having passed through the verification module 109 is conveyed to the stacker 110 through a sheet conveyance path 344. The sheet conveyed from the sheet conveyance path 344 via a sheet conveyance path 345 is flipped and stacked on the stack tray 341. The stacker tray 341 includes a lifting and lowering tray 342 and an eject tray 343. Further, the stacker 110 has an escape tray 346 as a sheet discharge tray. The escape tray 346 is a sheet discharge tray for discharging a sheet determined to have a print defect (image fault) by the verification module 109. In a case where a sheet is discharged onto the escape tray 346, the sheet is conveyed from the sheet conveyance path 344 to the escape tray 346 via a sheet conveyance path 347. In a case where a sheet is conveyed to the finisher 111 in the subsequent stage of the stacker 110, the sheet is conveyed via a sheet conveyance path 348. A reversing unit 349 is used without fail in a case where the discharge destination of a sheet is switched to another in accordance with the verification results in the verification module 109. The reason is to gain time for reading images on the sheet with the two cameras 331 and 332 and verifying the read images and switching the conveyance path to the sheet conveyance path 345 or 348. In a case verification is not performed, the reversing unit 349 is used only in a case where the sheet is flipped at the time of stacking the sheet onto the stack tray 341. The sheet for which no image fault has been detected as a result of the verification by the verification module 109 is conveyed to the finisher 111.

In the finisher 111, for the conveyed sheet, finishing processing, such as stapling (one portion/two-portion stapling), punching (two-hole/three-hole punching), and saddle stitching bookbinding, is performed. The finisher 111 comprises two sheet discharge trays 351 and 352. The sheet conveyed via a sheet conveyance path 353 is discharged onto the sheet discharge tray 351. However, it is not possible to perform the finishing processing, such as stapling, in the sheet conveyance path 353. In a case where the finishing processing, such as stapling, is performed, the sheet is conveyed to a processing mechanism 355 via a sheet conveyance path 354. Then, in the processing mechanism 355, the sheet is discharged onto the sheet discharge tray 352 after the finishing function designated by a user is performed. It is possible for each of the sheet discharge trays 351 and 352 to lift and lower. It is also to cause the finisher 111 to operate so that the sheet for which the finishing processing has been performed in the first processing mechanism 355 is stacked onto the sheet discharge tray 351 by lowering the sheet discharge tray 351. In a case where saddle stitching bookbinding is designated of the finishing function, in a second processing mechanism 356, after the stapling processing is performed at the sheet center, the sheet is folded in two and discharged onto a saddle stitching bookbinding tray 358 via a sheet conveyance path 357. The saddle stitching bookbinding tray 358 has a belt conveyer configuration and the configuration is such that a sheet bundle (saddle stitching bookbinding bundle) stacked on the saddle stitching bookbinding tray 358 is conveyed to the left side.

<Details of Verification Module>

Following the above, the method of using the verification module 109 is explained in detail, such as various kinds of setting work that a user should perform for the verification module 109 before starting verification processing. The verification module 109 verifies a conveyed printed sheet in accordance with verification items set in advance. The verification is performed by comparing the read image (in the following, called "verification-target image") corresponding to the verification-target side of the read images of both sides of the sheet obtained by capturing the printed sheet and the reference image registered in advance in association with the sheet side indicating one of the obverse side and the reverse side. As the image comparison method, there are a method of comparing the pixel values for each corresponding position in both images, a method of comparing the object positions by edge detection, a method of comparing recognition results by character recognition processing (OCR: Optical Character Recognition), and the like. In the following, with reference to various UI screens shown in FIG. 4 to FIG. 10, the preliminary preparation and setting of the verification module 109 are explained.

Figure 4:
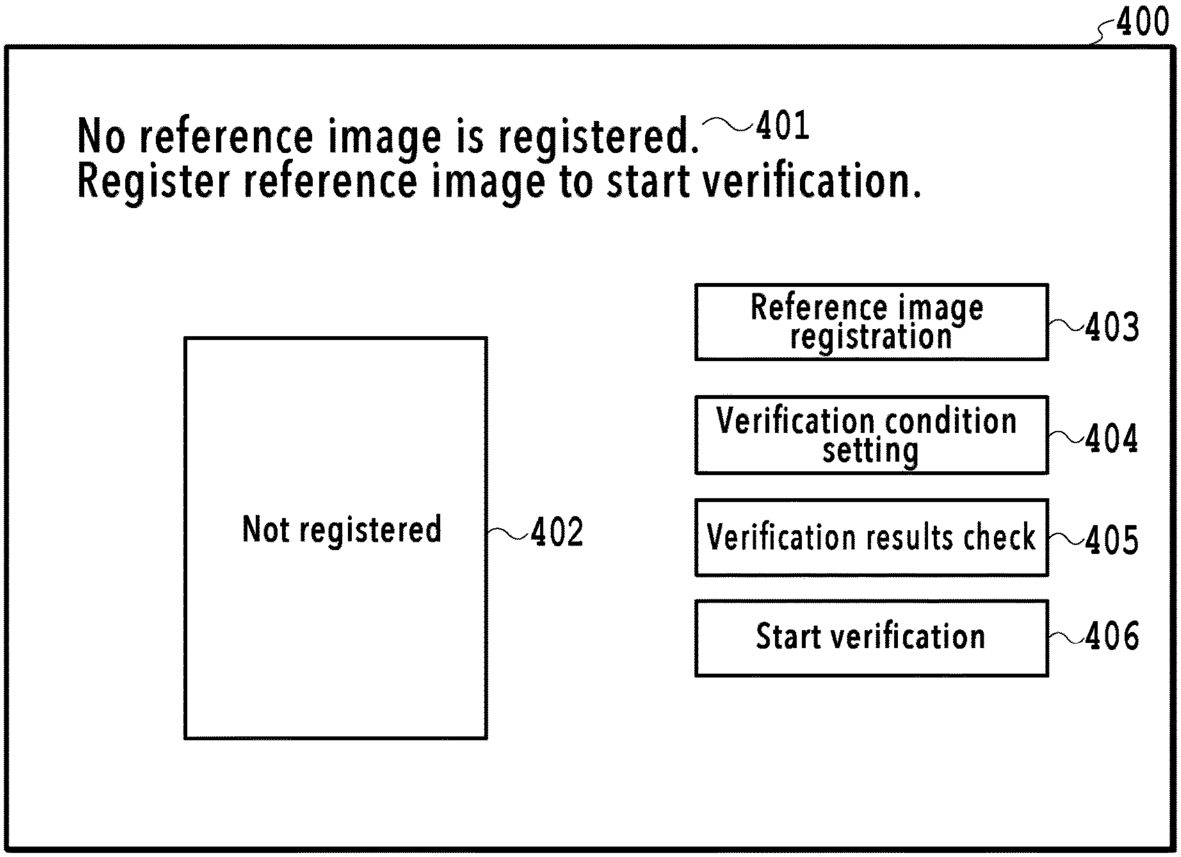
FIG. 4 is a diagram showing an example of a UI screen of the image forming apparatus (verification module)

FIG. 4 is an example of a UI screen (in the following, called "verification menu screen") that is displayed on the display unit 241 at the time of activation of the verification module 109. The display control of various UI screens including this verification menu screen is performed by the CPU 238 within the verification module 109.

On a verification menu screen 400 shown in FIG. 4, in a message field 401 located at the top left, a message to the effect that a reference image is not registered yet and a message to the effect that registration of a reference image is necessary prior to the start of verification processing are displayed. In a case where a reference image is already registered at the point in time of activation, a message to the effect that it is possible to start verification processing is displayed. Under the message field 401 is an image display area 402 in which a reference image is displayed. In the example in FIG. 4, a reference image is not registered yet, and therefore, a character string of "Not registered" is displayed. On the right side on the verification menu screen 400, four buttons 403 to 406 are arranged one on top of another. The button 403 is a button for calling a UI screen for performing registration of a reference image. The reference image is an image that is used as a reference at the time of determining whether there is a defect in a verification-target image. In the present embodiment, a printed sheet for which it is determined in advance that printing has been performed normally by visual verification and the like is captured by the image capturing unit 240 based on instructions of a user and the obtained read image is used as the reference image. The button 404 is a button for calling a UI screen for setting conditions at the time of verification. A user sets a verification item and a verification accuracy in accordance with the verification purpose. Here, as verification items, there are shift in printing position, tint of image, density of image, streak and thin spot, print omission, and the like. Further, the verification accuracy is an index of the magnitude of the difference from the reference image, by which it is determined that there is a defect, and is specified by a numerical value, for example, such as within 1%. The button 405 is a button for calling a UI screen for checking verification results. It is possible for a user to check the past verification contents and the verification results on a verification results check screen. The button 406 is a button for giving instructions to start verification. In a case where the pressing-down of the button 406 is detected, the verification module 109 starts verification of a printed sheet that is conveyed sequentially. The configuration of the verification menu screen 400 shown in FIG. 4 is an example and it may also be possible to design a configuration so that information other than that described above, for example, information relating to the setting of verification, such as the partition sheet setting, is displayed. Following the above, UI screens that are displayed in a case where the above-described three UI screen call buttons 403 to 405 are pressed down and their operations are explained.

<<Registration of Reference Image>>

Figure 5:
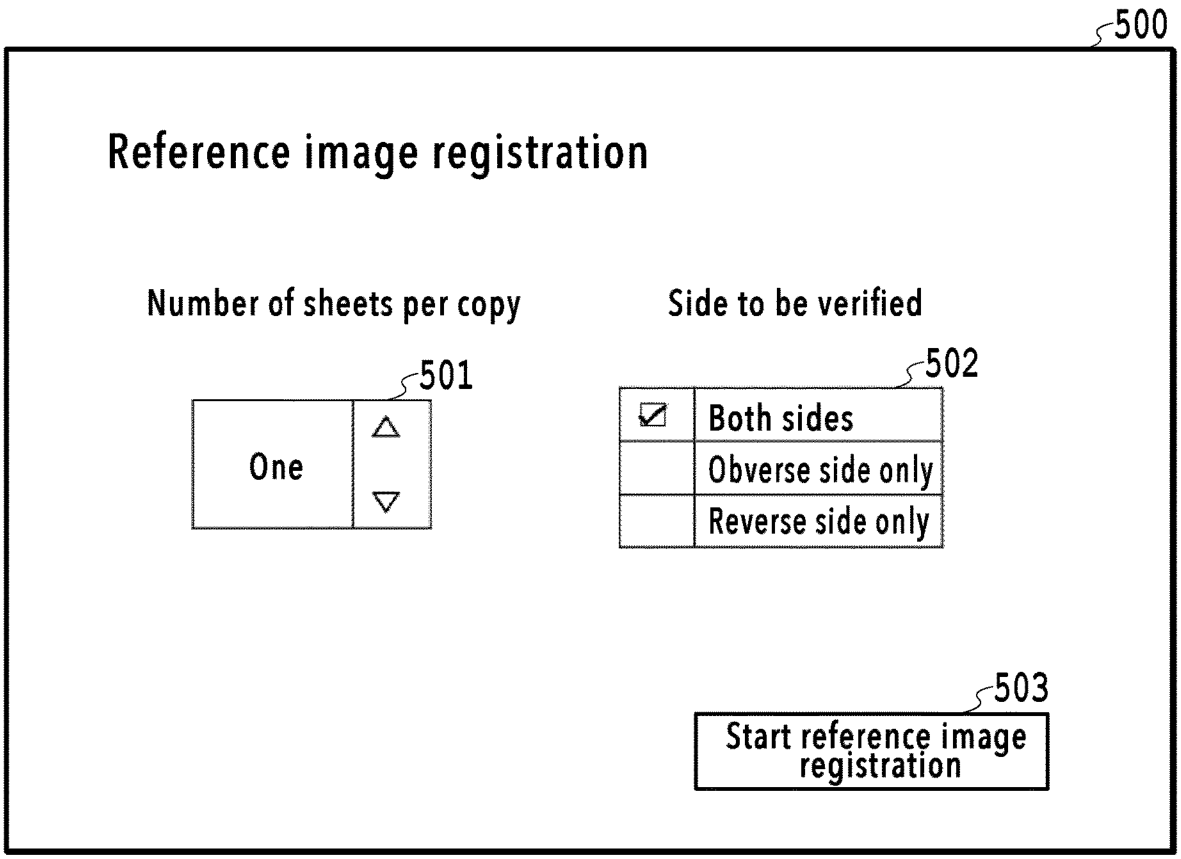
FIG. 5 is a diagram showing an example of a UI screen of the image forming apparatus (verification module)
Figure 6:
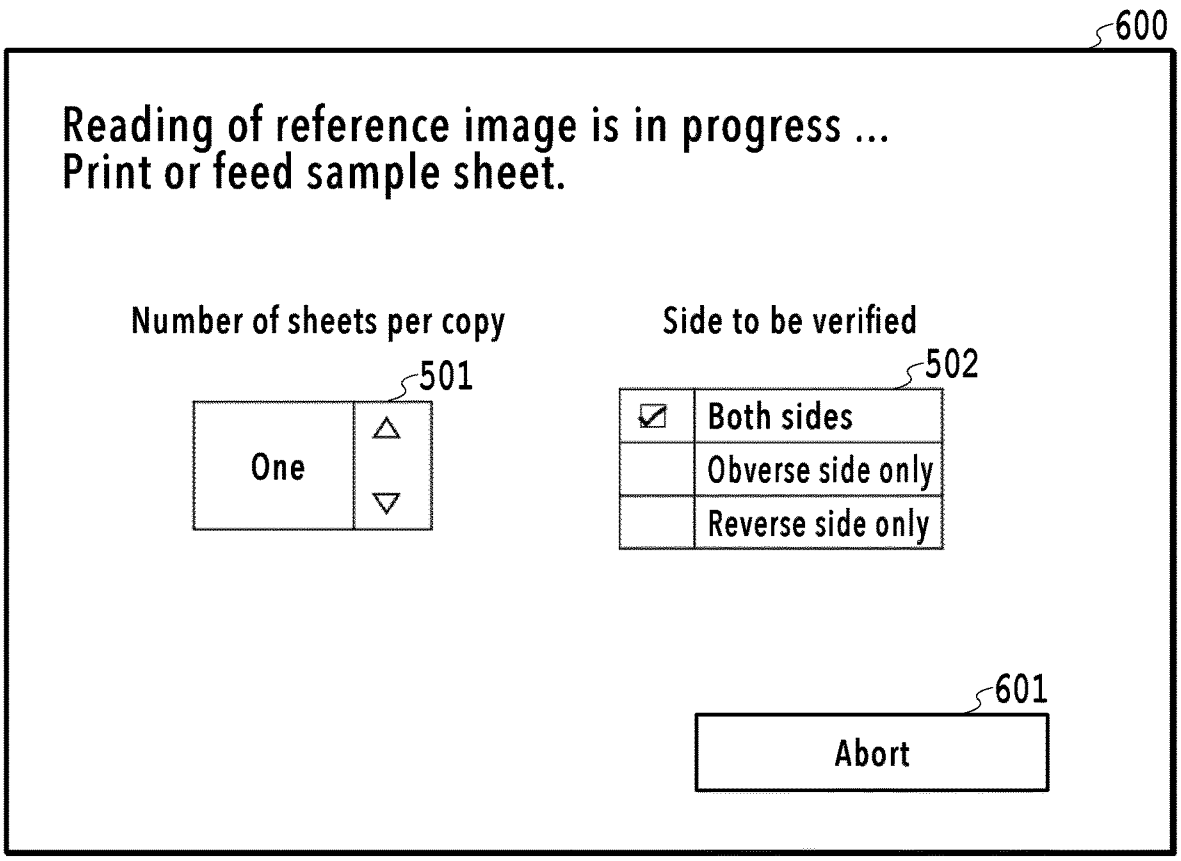
FIG. 6 is a diagram showing an example of a UI screen of the image forming apparatus (verification module)
Figure 7:
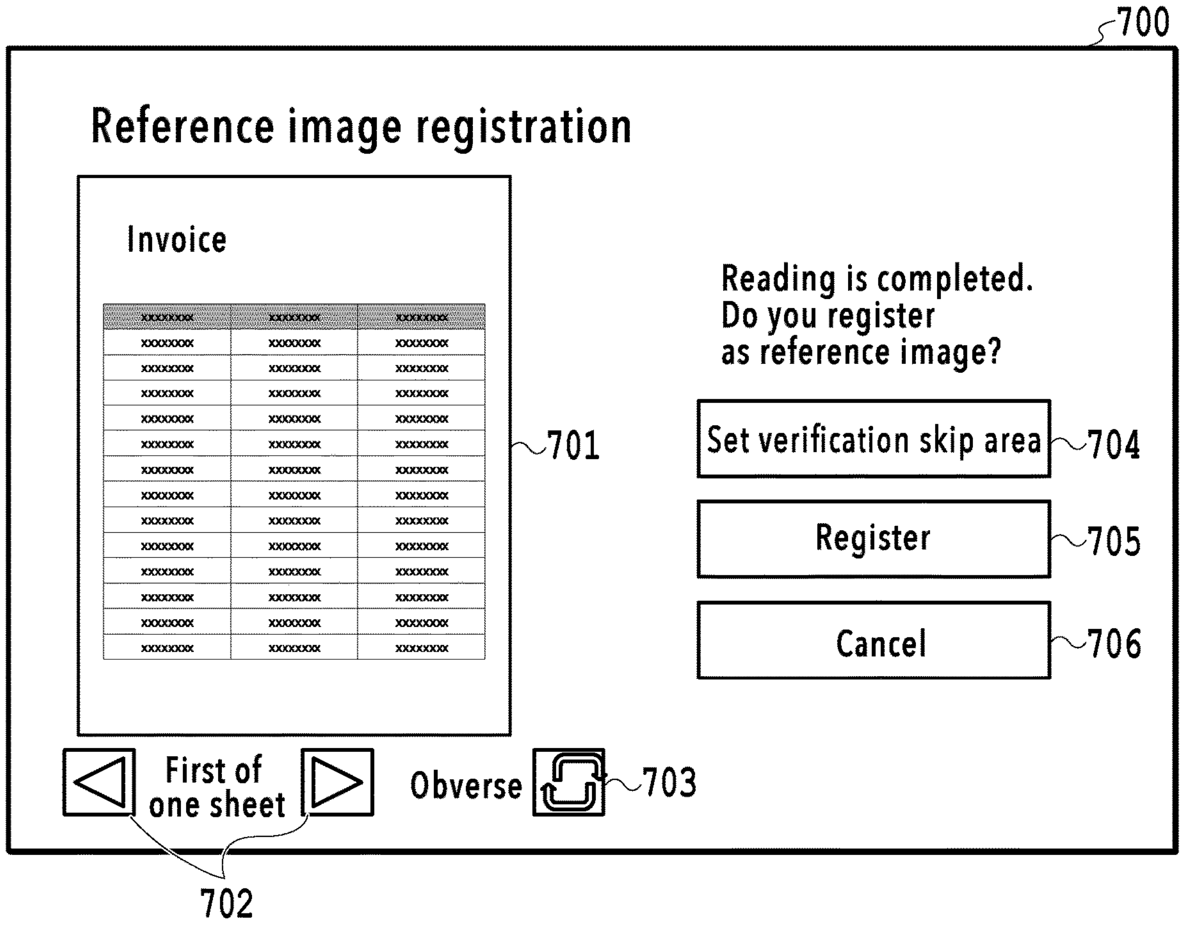
FIG. 7 is a diagram showing an example of a UI screen of the image forming apparatus (verification module)

On the above-described verification menu screen 400, in a case where a user presses down the button 403, a UI screen (in the following, called "image registration screen") for registering a reference image as shown in FIG. 5 is first displayed on the display unit 241. On an image registration screen 500 shown in FIG. 5, two setting areas 501 and 502 and one button 503 exist. The setting area 501 is an area for setting the number of sheets per copy of a print job accompanied by verification (in the following, called "verification job"). It is possible for a user to designate a desired number of sheets by operating a spin button within the setting area 501. Here, in a case where two or more sheets per copy are designated, that is, in a case where a printed material whose one copy consists of a plurality of sheets is verified, it is possible to register a reference image for each sheet. The setting area 502 is an area for setting the verification target-side of a sheet. It is possible to set to perform verification for both sides of a sheet or only for one side (at this time, only for the obverse side or only for the reverse side). Even in a case where printing is performed only for one side, the verification condition may be set so that verification of both sides is performed in order to verify that there is no dust attached to the side that is not printed. The button 503 is a button for starting the processing to read an image from a sample sheet and register it as a reference image. After performing the setting for the above-described two setting areas 501 and 502, the user presses down the button 503. Then, the screen transitions from the image registration screen 500 to a UI screen (in the following, called "reading-in-progress screen") 600 indicating that image reading is during standby. Then, both sides of the printed sheet to be taken as a sample sheet that is conveyed after the button 503 is pressed down are captured by the image capturing unit 240 and based on the setting contents in the above-described setting area 502, the reference image is registered in association with sheet side information indicating one of the obverse side and the reverse side.

Figure 8:
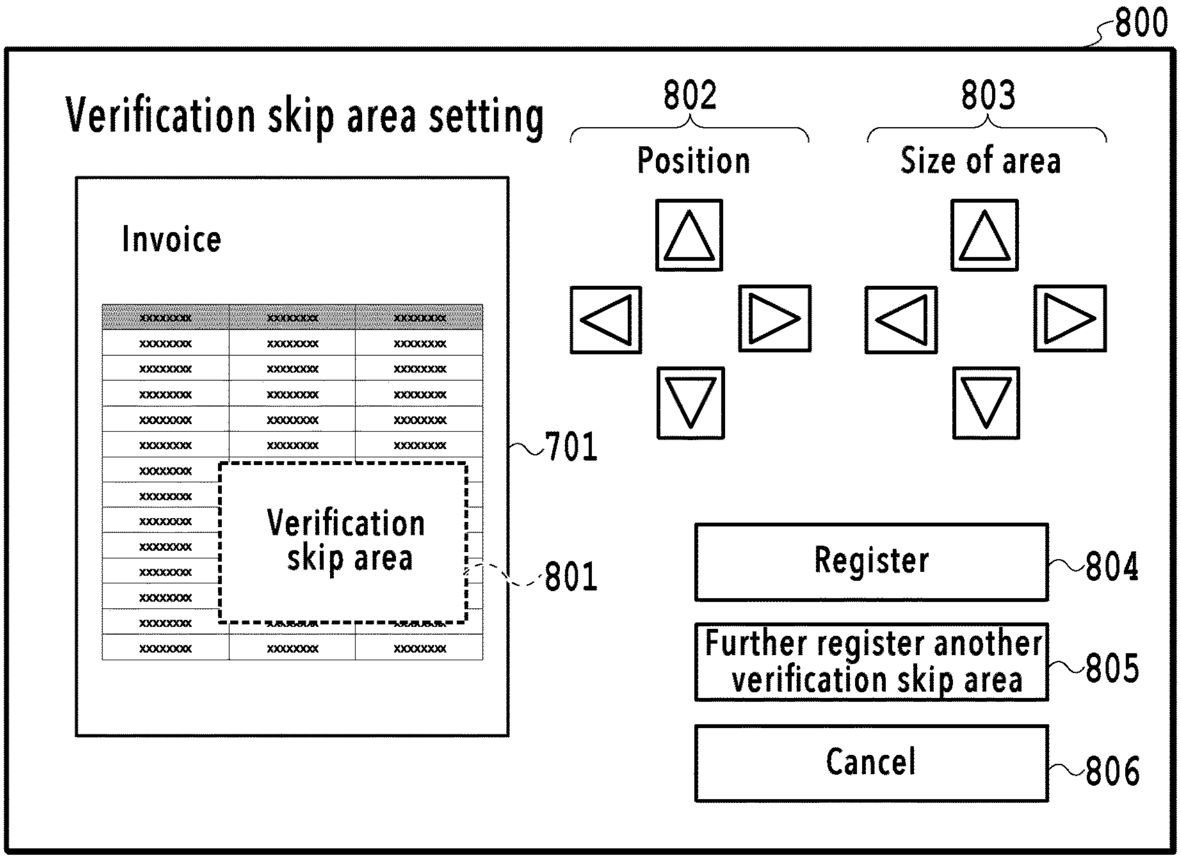
FIG. 8 is a diagram showing an example of a UI screen of the image forming apparatus (verification module)

At the time of registration of the reference image, it is assumed that the apparatus configuration is a fixed configuration in which the facing-up side of the sheet captured by the first camera 331 is "obverse side" and the facing-down side of the sheet captured by the second camera 332 is "reverse side". For example, it is assumed that placing the sample sheet on the inserter tray 321 of the inserter 108 in a specific orientation, such as "document faceup", is designated and the design is made so that the sheet facing-up side is the obverse side without fail at the time of the sheet passing through the verification module 109. However, in place of adopting the fixed apparatus configuration such as this, it may also be possible to enable registration of the read image of the sheet facing-up side captured by the first camera 331 as the reference image of "reverse side" by, for example, the UI setting. In either case, the reference image is registered in association with the sheet side. The display on the above-described reading-in-progress screen 600 continues until the reading of the image in accordance with the setting contents in the setting areas 501 and 502 is completed. A button 601 within the reading-in-progress screen 600 is a button for giving instructions to abort image reading. In a case where the button 601 is pressed down, image reading is aborted and the display returns to the above-described verification menu screen 400. Then, in a case where the image reading of the set number of sheets is completed normally, the screen transitions from the reading-in-progress screen 600 to a UI screen (in the following, called "registration processing screen") prompting registration of a reference image and setting of related items. On the left side on a registration processing screen 700, an image display area 701 in which a read image is displayed exists and further, under the area 701, a button 702 for switching a sheet to be displayed to another in a case where one copy includes a plurality of sheets and a button 703 for switching between the obverse side and the reverse side to be displayed of a sheet exist. It may also be possible not to display the button 702 in a case where the number of sheets per copy, which is set on the image registration screen 500, is one. Similarly, it may also be possible not to display the button 703 in a case where the verification-target side that is set on the image registration screen 500 is one side only. On the right side on the registration processing screen 700, three buttons 704 to 706 are arranged one on top of another. The button 704 is a button for setting an area (verification skip area) for which comparison with the verification-target image of the reference images is not performed. This verification skip area setting is used in a case where the verification-target area is limited. For example, as use cases, mention is made of a case of variable printing (VDP: Variable Data Printing) in which print contents are changed for a specific area within the sheet for each copy, a case where printing is performed by attaching a different ID for each copy, and a case where printing is performed by changing only the portions of the address and the name for each copy. In a case where the button 704 is pressed down, the screen transitions from the registration processing screen 700 to a UI screen (in the following, called "area setting screen") for setting a verification skip area as shown in FIG. 8. On an area setting screen 800 shown in FIG. 8, a broken line rectangle 801 within the image display area 701 indicates the verification skip area to be set. It is possible for a user to change the position of the verification skip area 801 with a position change button 802 and change the size thereof with a size change button 803. A user having determined the position and size of the verification skip area 801 presses down a button 804. Due to this, the set verification skip area 801 is registered in association with the reference image being displayed in the image display area 701. After the registration of the verification skip area is completed, the display returns to the registration processing screen 700. A button 805 is a button for further registering another verification skip area for the same reference image after registering a certain verification skip area. A button 806 is a button for cancelling the setting of a verification skip area. In a case where the button 806 is pressed down, the setting of a verification skip area is aborted and the display returns to the registration processing screen 700. Explanation is returned to the registration processing screen 700. The button 705 is a button for registering the read image being displayed in the image display area 701 as a reference image. In a case where the button 705 is pressed down, the read image displayed in the image display area 701 is registered as a reference image in association with the relevant sheet number (for example, the first sheet of ten sheets) and the sheet side (obverse side or reverse side). After the registration is completed, the display returns from the registration processing screen 700 to the verification menu screen 400. The button 706 is a button in a case where the registration of a reference image is cancelled. In a case where the button 706 is pressed down, the registration processing is aborted and the display returns to the verification menu screen 400.

<<Setting of Verification Condition>>

Figure 9:
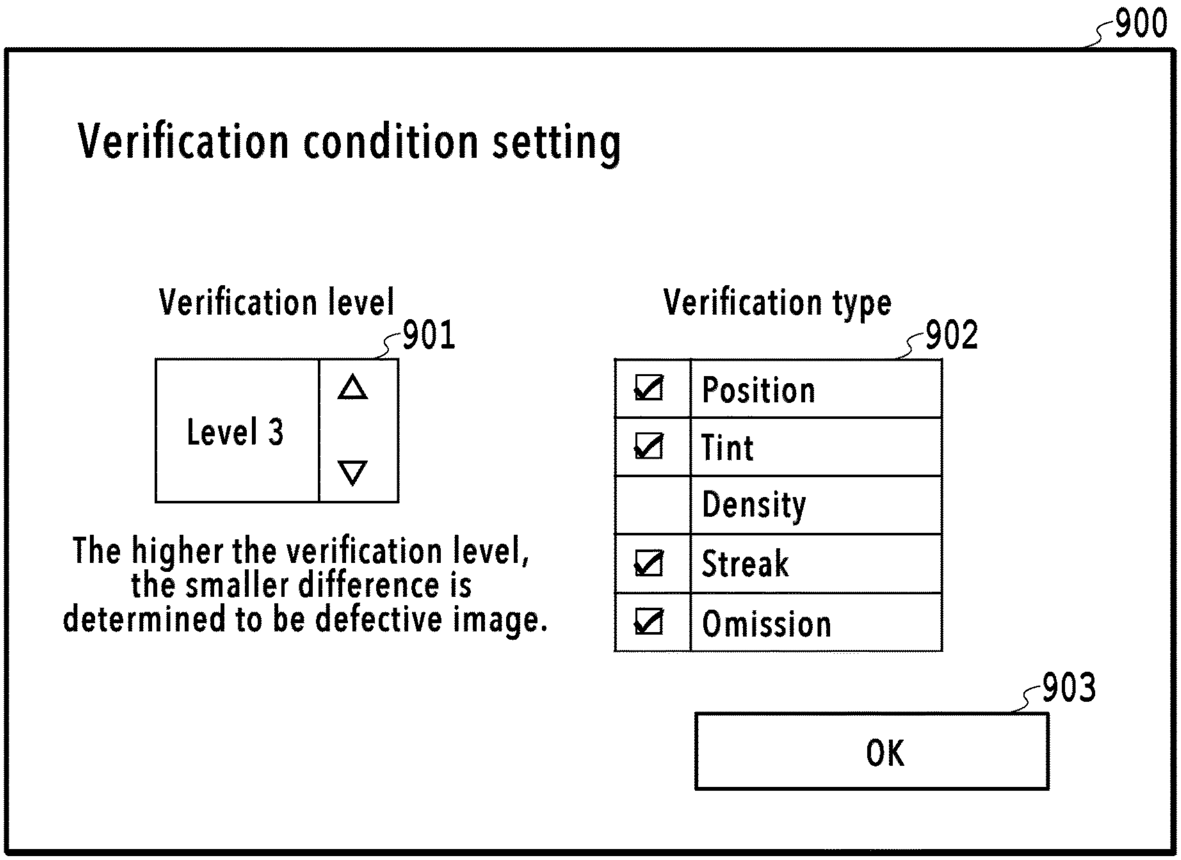
FIG. 9 is a diagram showing an example of a UI screen of the image forming apparatus (verification module)

On the above-described verification menu screen 400, in a case where a user presses down the button 404, a UI screen (in the following, called "condition setting screen") for setting a verification condition as shown in FIG. 9 is displayed on the display unit 241. On a condition setting screen 900, two setting areas 901 and 902 and an OK button 903 exist. The setting area 901 is an area for setting a detection level of a defect at the time of performing verification. It is possible for a user to set a desired verification level by operating a spin button within the setting area 901. Here, the higher the verification level that is set, the smaller difference between the reference image and the verification-target image is determined to be a defective image. The setting area 902 is an area for setting a verification item (verification type). It is possible for a user to select a viewpoint from which verification is performed in accordance with a verification purpose in a checkbox. In the example in FIG. 9, five items, that is, Position, Tint, Density, Streak, and Omission are prepared and four items of Position, Tint, Streak, and Omission are checked. In this case, Position, Tint, Streak, and Omission are targets of verification, but Density is not the target of verification. In a case where the OK button 903 is pressed down, the verification condition setting is completed and the display returns to the above-described verification menu screen 400.

<<Check of Verification Results>>

Figure 10:
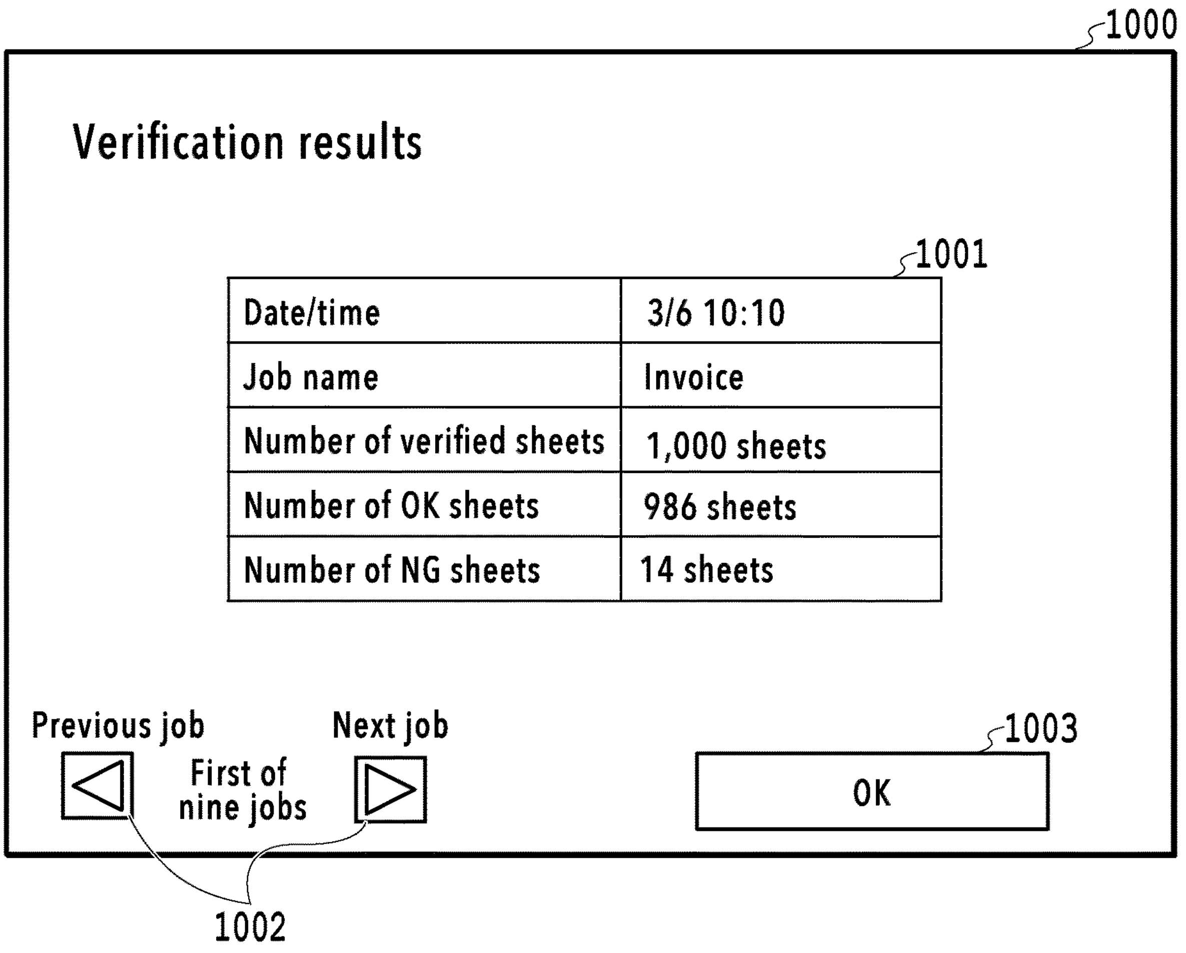
FIG. 10 is a diagram showing an example of a UI screen of the image forming apparatus (verification module)

In a case where a user presses down the button 405 on the above-described verification menu screen 400, a UI screen (in the following, called "results check screen") for checking verification results as shown in FIG. 10 is displayed on the display unit 241. On a results check screen 1000, a results display area 1001 that displays details of verification results, a button 1002 for switching a display-target verification job to another, and an OK button 1003 exist. Here, in the results display area 1001, among nine verification jobs whose history is stored, each piece of information on the first job is displayed, such as the verification execution date, the name of the target verification job, the number of verified sheets, the number of OK sheets of the number of verified sheets, and the number of NG sheets. Then, it is possible for a user to switch the display-target verification job to another by operating the left and right spin buttons 1002. In a case where a user having checked the verification results presses down the OK button 1003, the display is returned to the above-described verification menu screen 400.

<Details of External Controller>

Figure 11:
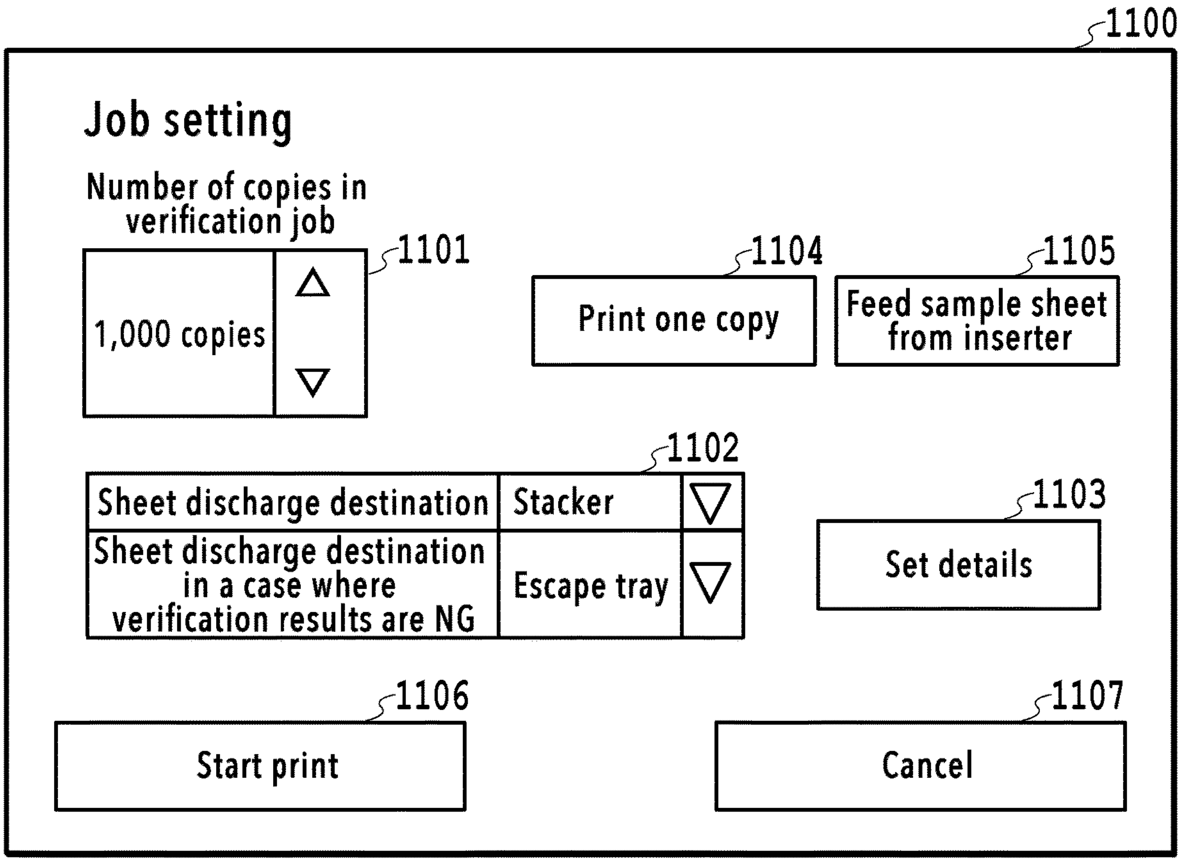
FIG. 11 is a diagram showing an example of a UI screen of the image forming apparatus (verification module)

Following the above, the method of using the external controller 102 is explained in detail. A user having performed the above-described various preliminary settings for the verification module 109 generates a job for reference image registration (in the following, called "registration job") and the above-described verification job by using the external controller 102 and inputs them to the image forming apparatus 101. FIG. 11 is an example of a UI screen (in the following, called "Job setting screen") for setting operation conditions in the registration job and the verification job, which is displayed on the display 212 of the external controller 102. The display control of this Job setting screen is performed by the CPU 208 within the external controller 102. On a Job setting screen 1100, two setting areas 1101 and 1102 and five buttons 1103 to 1107 exist. The setting area 1101 is an area for setting the number of copies in the verification job. In the example in FIG. 11, a verification job designating printing of 1,000 copies is generated. The setting area 1102 is an area for setting the sheet discharge destination of the sheet processed in accordance with the registration job and the verification job. In the example in FIG. 11, the stacker 110 is selected as the basic sheet discharge destination and the escape tray 346 is selected as the sheet discharge destination in a case where a print defect is detected (that is, in a case where NG is determined in verification processing). It is possible for a user to select a sheet discharge destination in accordance with the purpose so that, for example the sheet is discharged onto the escape tray 346 to enable an immediate print results check at the time of reference image registration, or the sheet is discharged onto the stacker 110 at the time of printing of a large number of sheets accompanied by verification processing, and so on. Further, it may also be possible to design the configuration so that it is possible to set a plurality of sheet discharge destinations for the basic sheet discharge destination and for the sheet discharge destination in a case where a defect is detected, respectively. The button 1103 is a button for setting printing conditions other than the sheet discharge destination. By pressing down the button 1103, a popup screen (not shown schematically) is displayed and it is possible for a user to perform the layout setting, the print quality setting, the finishing setting, the sheet discharge side setting and the like. Here, the layout setting is a setting designating, for example, both-sided printing, 2-in-1 printing and the like. The print quality setting is a setting designating, for example, which of quality and processing speed priority is given to at the time of printing. The finishing setting is a setting designating the contents of the postprocessing, such as stapling and hole punching. The sheet discharge side setting is a setting designating faceup (obverse side faces up) or facedown (obverse side faces down) the sheet is discharged onto the selected discharge destination.

The two buttons 1104 and 1105 arranged side by side at the top left on the Job setting screen 1100 are buttons that are used at the time of registering a reference image. First, the button 1104 on the left side is an instruction button in a case where a sheet to be taken as a sample sheet is printed and an image on the printed sheet is read and the read image is registered as a reference image. In a case where the button 1104 is pressed down, a registration job instructing the printing module 107 to print one copy of sheet and instructing the verification module 109 to read the image of the printed sheet and register the read image is generated and the registration job is input to the image forming apparatus 101. Then, in the image forming apparatus 101, the series of processing in accordance with the registration job is performed and the reference image is registered. Further, the button 1105 on the right side is an instruction button in a case where an already printed sample sheet is fed from the inserter and read and the read image is registered as a reference image. This button 1105 on the right side is used in a case where an image is read from a sheet (sample sheet) for which a user has determined that printing is performed normally by visual verification and the read image is registered as a reference image, instead of performing print processing and reading and registration of a reference image continuously. Before pressing down the button 1105, a user places the sample sheet on the tray 321 of the inserter 108. Due to this, the sample sheet is taken in, conveyed into the inside of the verification module 109, the image on the sample sheet is read, and the read image is registered as a reference image. Here, the sample sheet may be fed from the sheet feed unit 230 of the printing module 107, but by doing so, there is a case where the image of the sample sheet may change or degenerate due to application of pressure and heat because the sample sheet passes through the fixing unit 311 and the second fixing unit 313. Because of this, it is desirable to feed the already printed sample sheet from the inserter 108 in a case where a reference image is registered by using the already printed sample sheet. In the present embodiment, it is assumed that prior to pressing down the button 1104 or 1105, a user instructs the verification module 109 to start registration of a reference image (presses down the button 503 on the image registration screen 500 described previously).

The button 1106 located at the bottom on the screen is a button for giving instructions to start execution of print processing accompanied by verification. In a case where the button 1106 is pressed down, the external controller 102 generates a verification job based on the contents of the setting performed on the Job setting screen 1100 and inputs the verification job to the printing module 107. In the present embodiment, it is assumed that prior to pressing down the button 1106, a user instructs the verification module 109 to start printing of a verification job (presses down the button 406 on the verification menu screen 400 described previously). In a case where a verification job is input from the external controller 102, the print processing of the designated number of copies is performed in the printing module 107 and the printed sheet is sequentially conveyed to the verification module 109 and verified in accordance with the verification condition set in advance. The button 1107 is a button for cancelling the setting work relating to the verification and in a case where the button 1107 is pressed down, the Job setting screen 1100 closes.

<Registration Processing of Reference Image>

Figure 12:
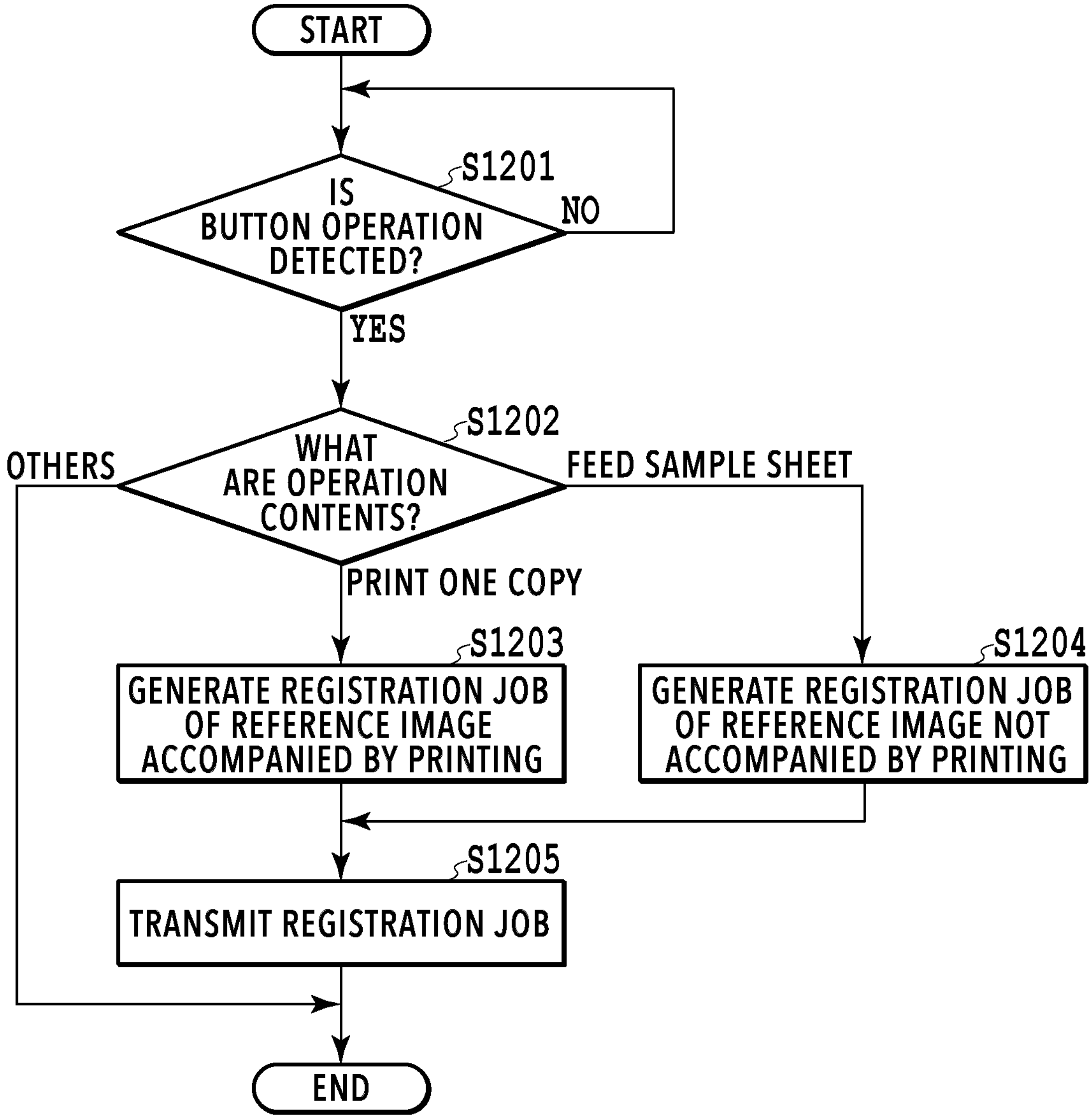
FIG. 12 is a flowchart showing a flow of processing until a registration job is generated and input to the image forming apparatus.
Figure 13:
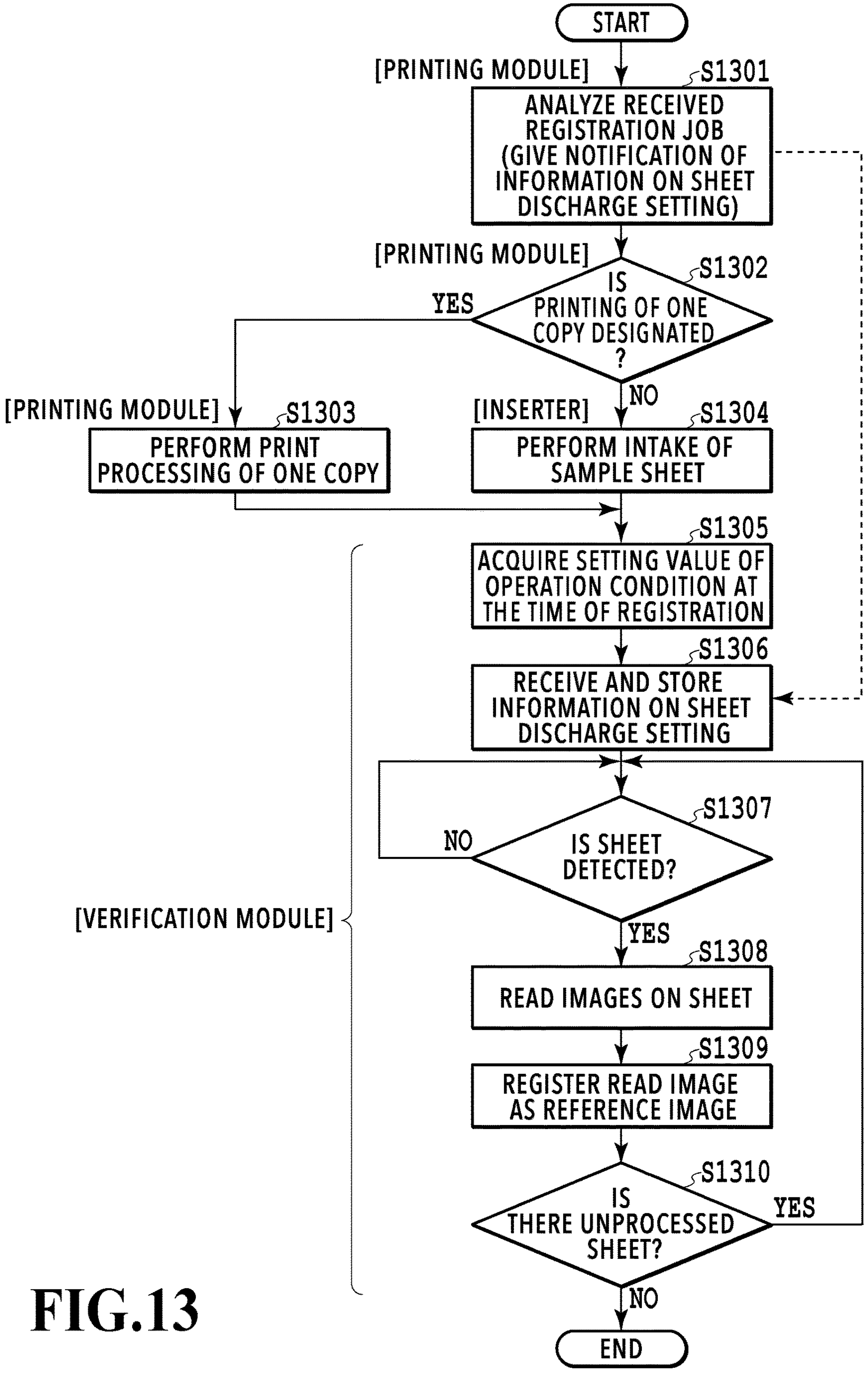
FIG. 13 a flowchart showing a flow of processing until a reference image is registered in accordance with a registration job.

Following the above, a flow of specific processing at the time of registering a reference image is explained. FIG. 12 is a flowchart showing a flow of processing until the external controller 102 generates a predetermined registration job and inputs the registration job to the image forming apparatus 101 in a case where the button 1104 or 1105 is pressed down on the Job setting screen 1100 described previously. Then, FIG. 13 is a flowchart showing a flow of processing until a reference image is registered in accordance with the registration job input from the external controller 102 in the image forming apparatus 101. Symbol "S" in the flowcharts in FIG. 12 and FIG. 13 means a step.

<<Processing on the Side of External Controller>>

51201 in the flowchart shown in FIG. 12 is processing to monitor the button operation by a user for the Job setting screen 1100 being displayed. In a case where the operation of one of the buttons is detected, the processing advances to S1202. At S1202, the processing is branched in accordance with the contents of the button operation. In a case where the detected button operation is pressing-down of the button 1104 of "Print one copy" is pressed down, the processing advances to S1203 and in a case where the detected button operation is pressing-down of the button 1105 of "Feed sample sheet from inserter", the processing advances to S1204. In a case where the detected button operation is pressing-down of a button other than the buttons 1104 and 1105, this processing is exited.

At S1203, a registration job giving instructions to register an image obtained by, after performing print processing of only one copy, reading the printed sheet as a reference image is generated. In the registration job in this case, printing-target image data, information on the sheet feed destination and the like are included. On the other hand, at S1204, a registration job giving instructions to take in the printed material (sample sheet) that is the sample, for which it has already been checked that there is no image default, from the inserter 108 and register the image obtained by reading the sample sheet as a reference image is generated. This registration job is not accompanied by print processing, unlike the registration job that is generated at S1203, and therefore, the registration job in this case may not include image data, information on the sheet the sheet feed destination and the like. However, both in the registration job that is generated at S1203 and in the registration job that is generated at S1204, the contents of the sheet discharge setting (that is, information on the sheet discharge destination and sheet discharge side) performed on the Job setting screen 1100 described previously are included.

At S1205, the registration job of the reference image, which is generated at S1203 or S1204, is transmitted to the image forming apparatus 101 via the LAN I/F 214.

The above is the flow of the processing on the side of the external controller 102 at the time of registering the reference image.

<<Processing on the Side of Image Forming Apparatus>>

The series of processing shown in the flowchart in FIG. 13 starts in response to the printing module 107 of the image forming apparatus 101 receiving the registration job transmitted from the external controller 102.

First, at S1301, the printing module 107 analyzes the registration job received from the external controller 102. Then, the printing module 107 controls the inserter 108, the verification module 109, the stacker 110, and the finisher 111 via the communication cable 254 in accordance with the contents of the received registration job. As a result of the job analysis, depending on whether performing the print processing of only one copy in order to read a reference image or taking in an already printed sample sheet, the control contents differ. Further, at this step, processing to notify the verification module 109 of the information on the sheet discharge setting, which is extracted from the registration job, is also performed. Then, at S1302, the processing is branched in accordance with the above-described determination results. Specifically, in a case where the one-copy printing is designated in the registration job, the processing advances to S1303 and in a case where the intake of an already printed sample sheet is designated, the processing advances to S1304.

At S1303, the printing module 107 performs the print processing of only one copy by using the image data included in the registration job received at S1301. The sheet that is used for this print processing is supplied from the sheet feed destination designated in the registration job. The printed sheet is conveyed to the verification module 109.

At S1304, the inserter 108 takes in the sample sheet placed on the tray 321 in accordance with the instructions from the printing module 107. The taken-in sample sheet is conveyed to the verification module 109. The processing at S1305 and subsequent steps is processing in the verification module 109.

At S1305, the verification module 109 acquires the setting values (that is, values specifying the number of sheets per copy and the verification-target side) of the operation conditions at the time of registering the reference image set by a user on the image registration screen 500. The acquired setting values are stored in the memory 239. It may also be possible to perform this step in parallel to S1303 and S1304 after receiving the registration job at S1301. At next S1306, processing to receive the information on the sheet discharge setting notified by the printing module 107 and store the information in the memory 239 is performed.

S1307 that follows is detection processing of the sheet that is conveyed (sheet for which print processing has been performed in the printing module 107 or sample sheet taken in by the inserter 108). In a case where the sheet is detected, the processing advances to S1308. Then, at S1308, first, the conveyed sheet is captured by the image capturing unit 240 and the images on both sides of the sheet are read. Then, the read images are stored in the memory 239 and at the same time, displayed in the image display area 701 on the registration processing screen 700 described previously. The sheet for which image reading is completed is discharged in accordance with the sheet discharge setting notified by the printing module 107. Then, in response to the button 705 within the registration processing screen 700 being pressed down, the processing advances to S1309. Then, at S1309, the read image corresponding to the verification-target side among the read images read at S1308 and stored is stored and registered in the memory 239 as the reference image. At this time, the setting value acquired at S1305 is referred to and the read image is registered along with information indicating which sheet side of what number sheet the reference image corresponds to, for example, such as "the obverse side of the first sheet". In the present embodiment, as described previously, the facing-up side of the sheet captured by the first camera 331 is the obverse side and the facing-down side of the sheet captured by the second camera 332 is the reverse side.

At S1310, whether the reading of images for the number of sheets specified by the setting value acquired at S1305 and the registration of the reference image are completed is determined. In a case where those are not completed, the processing returns to S1307 and the processing for the next sheet is continued. On the other hand, in a case where those are completed, this processing is terminated.

The above is the contents of the processing at the time of registering the reference image in the image forming apparatus 101 of the present embodiment.

<Print Processing Accompanied by Verification>

Next, a flow of specific processing at the time of performing print processing accompanied by verification is explained. In response to the pressing-down of the "Start print" button 1106 within the Job setting screen 1100 described previously, the external controller 102 generates the verification job described previously and inputs the verification job to the image forming apparatus 101 and gives instructions to perform print processing accompanied by verification. As described previously, in the present embodiment, it is assumed that the "Start verification" button 406 is pressed down on the verification menu screen 400 of the verification module 109 before the "Start print" button 1106 within the Job setting screen 1100 is pressed down.

Figure 14:
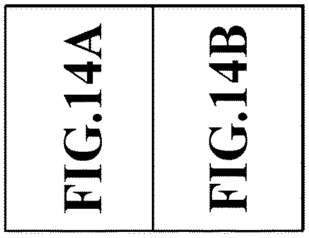
FIG. 14 is a diagram showing a relationship between FIGS. 14A and 14B, and FIGS. 14A and 14B are flowcharts showing a flow of a series of processing in the image forming apparatus to which a verification job is input.
Figure 14A:
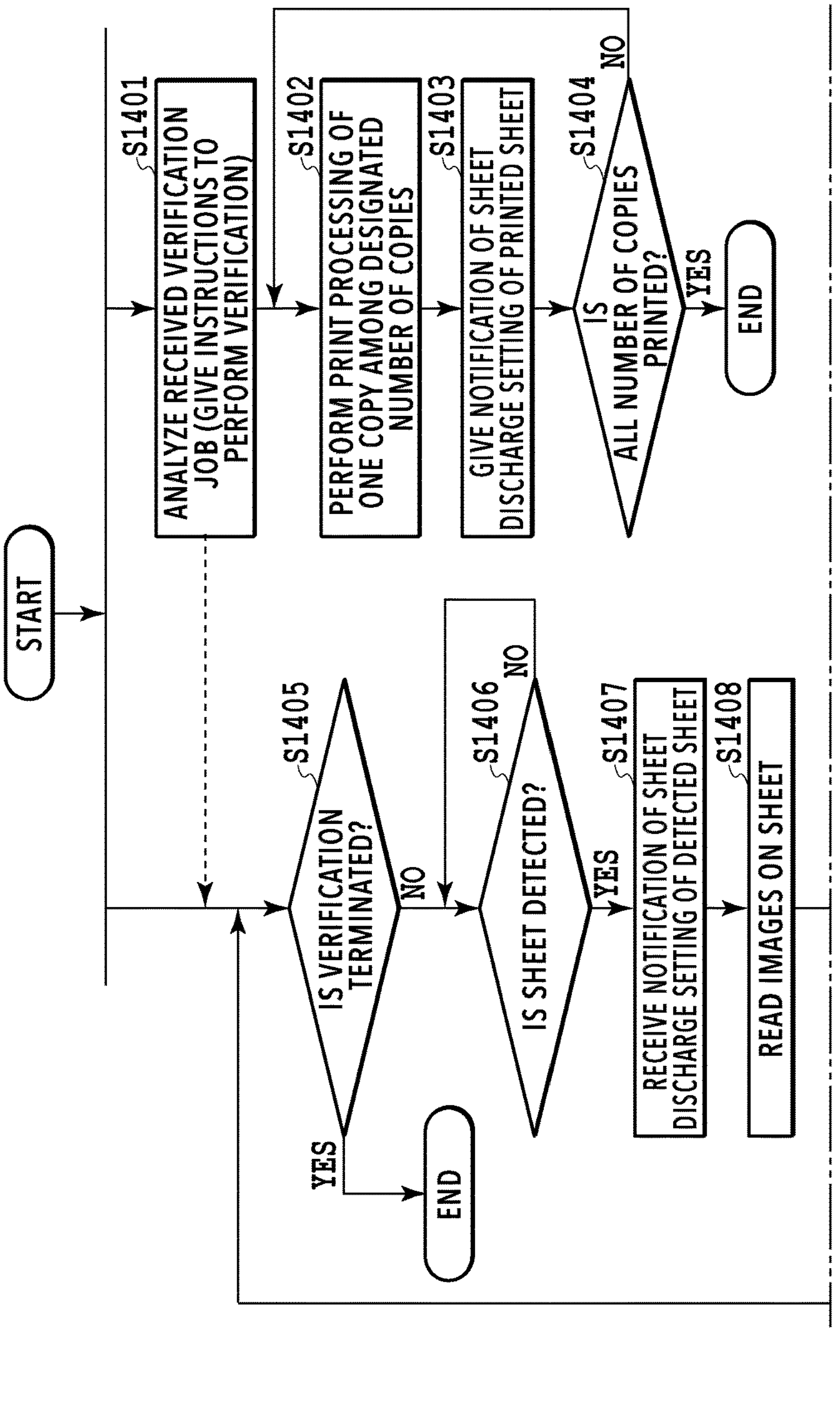
Figure 14B:
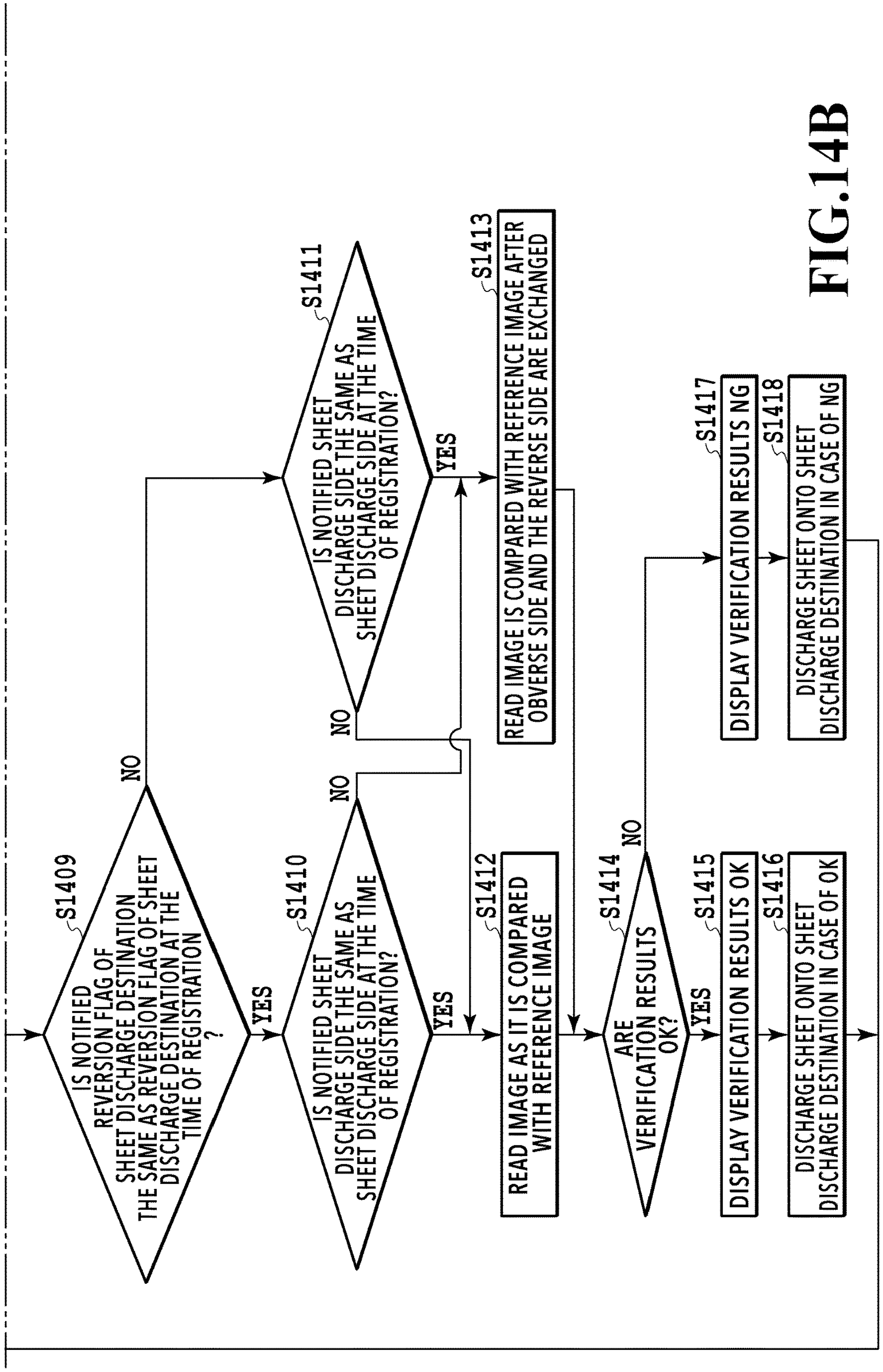

FIGS. 14A and 14B are flowcharts showing a flow of a series of processing in the image forming apparatus 101 to which a verification job is input. The series of processing shown in the flowcharts in FIGS. 14A and 14B starts in response to the printing module 107 of the image forming apparatus 101 receiving the verification job transmitted from the external controller 102. Symbol "S" in the flowcharts in FIGS. 14A and 14B means a step.

Each piece of processing at S1401 to S1404 is performed in the printing module 107. First, at S1401, the verification job received from the external controller 102 is analyzed.

Then, the printing module 107 controls the inserter 108, the verification module 109, the stacker 110, and the finisher 111 via the communication cable 254 in accordance with the analysis results of the received verification job. Here, the verification module 109 is instructed to perform verification processing of a printed sheet. Then, at S1402, the print processing is performed for the copy (first copy immediately after the processing starts) for which the processing has not been performed yet among the number of copies designated in the verification job. At S1403 that follows, the verification module 109 is notified of the information on the sheet discharge setting of the sheet for which the print processing has been performed, in detail, the information on the sheet discharge destination and the sheet discharge side. The "sheet discharge destination" here is the basic sheet discharge destination that is set as the sheet discharge destination in a case where OK is determined (there is no print defect) in the verification processing and in the following, this is described as "basic sheet discharge destination". Then, at S1404, whether or not the print processing for all the number of copies designated in the verification job is completed is determined and in a case where the print processing is not completed, the processing returns to S1402 and the print processing for the rest of the number of copies is continued. On the other hand, in a case where the print processing is completed, the processing in the printing module 107 is terminated.

Each piece of processing at subsequent S1405 to S1418 starts in the verification module 109 in response to instructions to perform verification processing from the printing module 107 and is performed in parallel to the print processing (S1402 to S1404) in the printing module 107. First, at S1405, whether the timing is that at which the verification processing is terminated is determined. For example, a case where a "Terminate verification" button 1703 within a UI screen shown in FIG. 17 and FIG. 18, to be described later, is pressed down, or a case where the verification processing for all the number of copies designated in the verification job is completed is the timing at which verification is terminated. In a case where the timing is not that at which verification is terminated, the processing advances to next S1406 and detection processing of a printed sheet that is conveyed is performed. Then, in a case where the sheet is detected, the processing advances to S1407. At S1407, the notification of the basic sheet discharge destination and the sheet discharge side of the detected printed sheet is received from the printing module 107. At next S1408, the facing-up side and the facing-down side of the detected printed sheet are captured respectively by the first camera 331 and the second camera 332. At this time, the images of the facing-up side and the facing-down side of the sheet are read irrespective of the verification-target side designated in the registration job described previously. Then, to each of the obtained read images, information indicating which of the facing-up side and the facing-down side the side corresponds to is attached and the read images are stored in the memory 239. Further, these read images are displayed in an image display area 1701 within a UI screen (verification status screen) showing the status of the sheet being verified.

Figure 15:
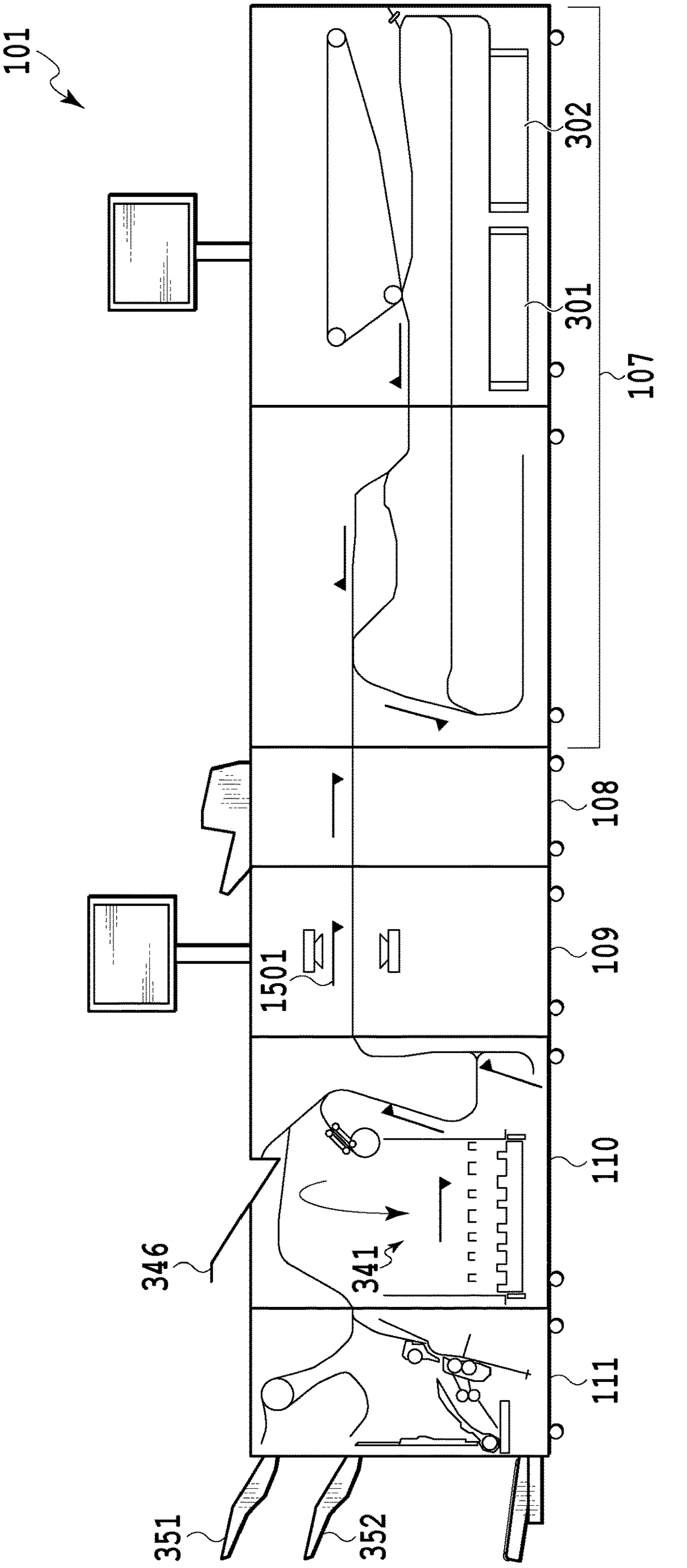
FIG. 15 is a diagram explaining conveyance of a sheet within the image forming apparatus.
Figure 16:
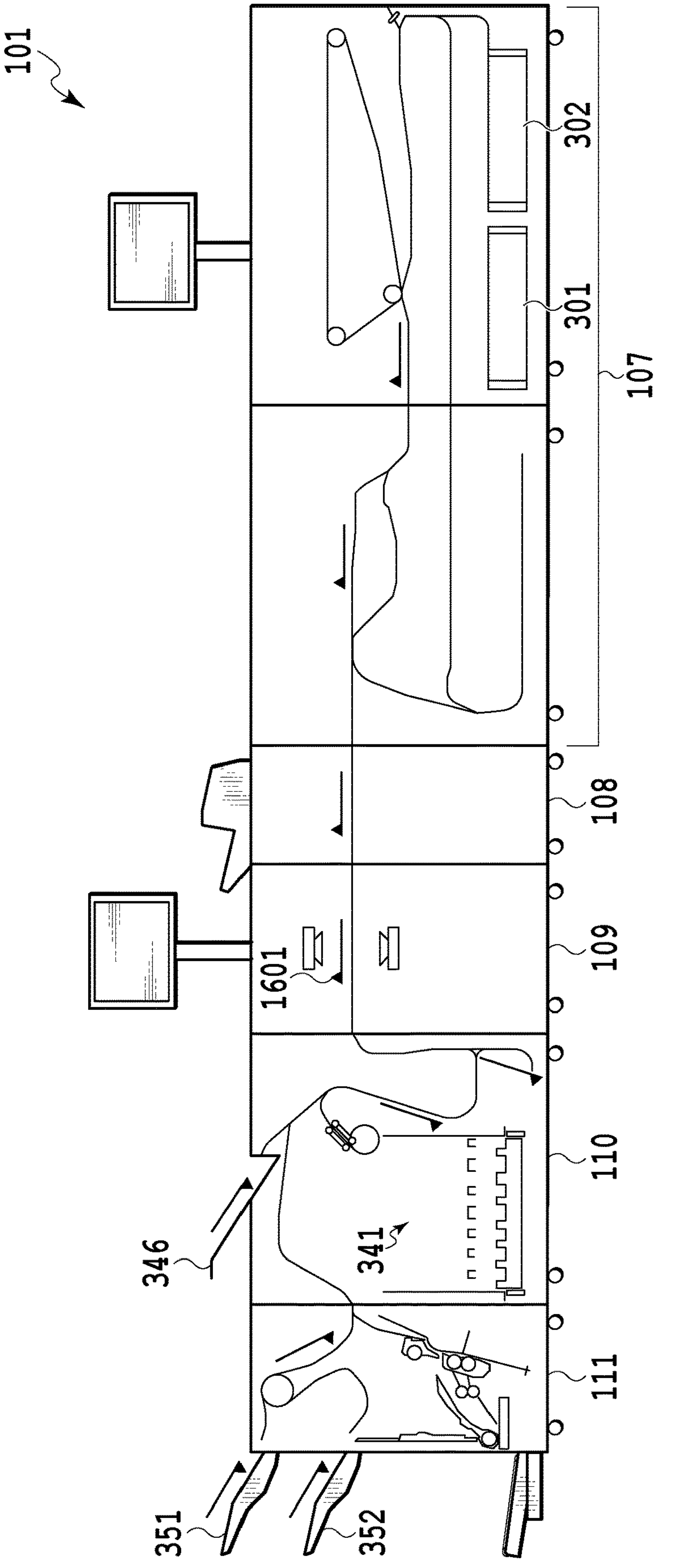
FIG. 16 is a diagram explaining conveyance of a sheet within the image forming apparatus.

Next S1409 to S1411 are processing steps to determine whether the printed sheet that is conveyed within the verification module 109 passes with the same orientation (faceup or facedown) as that at the time of the reference image registration. In a case where the sheet passes with the same orientation, the processing advances to S1412 and in a case where the sheet passes with a different orientation, the processing advances to S1413. Here, explanation is given by taking a specific example. FIG. 15 is a diagram showing the conveyance status of the sheet in a case where the sheet is discharged facedown onto the stack tray 341 of the stacker 110. Further, FIG. 16 is a diagram showing the conveyance status of the sheet in a case where the sheet is discharged facedown onto the sheet discharge trays 351/352 of the finisher 111 or the escape tray 346 of the stacker 110. Then, a black triangular mark in FIG. 15 and FIG. 16 indicates the print side (obverse side) of the sheet. The print side of the sheet that passes within the verification module 109 faces down (facedown) as shown by a sheet 1501 in FIG. 15 and the print side faces up (faceup) as shown by a sheet 1601 in FIG. 16. The sheets pass within the verification module 109 with different orientations in the case in FIG. 15 and in the case in FIG. 16, and therefore, the processing advances to S1413. In the following, processing to determine the sheet side at the time of passing is explained in detail.

First, at S1409, for the basic sheet discharge destination notified at S1407 and the sheet discharge destination stored at the time of the reference image registration (see S1306 described previously), whether each reversion flag has the same contents (flag value) is determined. Here, the reversion flag is a flag indicating whether reversion processing is accompanied at the time of discharging the sheet at each sheet discharge destination and has a value of "1 (ON)" in a case where reversion processing is accompanied and has a value of "0 (OFF)" in a case where reversion processing is not accompanied. Table 1 below shows the reversion flag for each sheet discharge destination existing in the image forming apparatus 101 of the present embodiment.

TABLE 1

| Sheet discharge destination | Reversion flag |
|---|---|
| stack tray | 1 |
| escape tray | 0 |
| sheet discharge tray of upper row of finisher | 0 |
| sheet discharge tray of lower row of finisher | 0 |

As shown in Table 1 described above, the stack tray 341 of the stacker 10 flips and stacks the sheet, and therefore, the value of the reversion flag is "1" indicating that reversion processing is performed. In contrast to this, the other sheet discharge destinations do not reverse the sheet at the time of sheet discharge, and therefore, the value of the reversion flag is "0" indicating that reversion processing is not performed. Here, the stacker 110 of the present embodiment flips and stacks the sheet onto the stack tray 341, but what is required is that the obverse side and the reverse side of the sheet be exchanged, and therefore, the reversion method is arbitrary. Whether or not reversion processing is performed for each sheet discharge destination is determined in advance depending on the mechanism of the image forming apparatus, and therefore, it is sufficient to store the information on the reversion flag for each sheet discharge destination as shown in Table 1 described above in the nonvolatile HDD 221. Then, it is assumed that the CPU 222 reads the information on the reversion flag at the time of the activation of the printing module 107 and notifies the verification module 109 of the information via the communication I/Fs 217 and 237 and the information is temporarily stored in the memory 239 within the verification module 109 and utilized. In a case where the notified reversion flag value of the basic sheet discharge destination and the reversion flag value of the sheet discharge destination at the time of the reference image registration are the same, the processing advances to S1410. On the other hand, in a case where the values of both reversion flags are different, the processing advances to S1411.

At S1410 and S1411, whether the sheet discharge side notified at S1407 is the same as the sheet discharge side stored at the time of the reference image registration (see S1306 described previously) is determined. For example, in a case where the notified sheet discharge side is faceup and the sheet discharge side at the time of the reference image registration is also faceup, it is determined that that sheet discharge side is the same. In contrast to this, in a case where one of the sheet discharge sides is faceup and the other sheet discharge side is facedown, it is determined that the sheet discharge sides are different. At S1410, in a case where it is determined that the sheet discharge side is the same, the processing advances to S1412 and in a case where it is determined that the sheet discharge sides are different, the processing advances to S1413. Further, at S1411, in a case where it is determined that the sheet discharge side is the same, the processing advances to S1413 and in a case where it is determined that the sheet discharge sides are different, the processing advances to S1412. For example, it is assumed that at the time of the reference image registration, the sheet is discharged facedown onto the escape tray 346 (see FIG. 16 described previously) and the sheet is discharged facedown onto the stack tray 341 at the time of printing accompanied by verification (see FIG. 15 described previously). In this case, the stacking of the sheet onto the stack tray 341 is accompanied by the flip, but the sheet discharge onto the escape tray 346 is not accompanied by the flip (see Table 1 described previously). Consequently, the results of the determination at S1409 are "NO". Then, the sheet is discharged facedown onto both the stack tray 341 and the escape tray 346, and therefore, the results of the determination at S1411 are "YES". In this manner, in a case where at the time of the reference image registration, the sheet is discharged facedown onto the escape tray 346 and at the time of printing accompanied by verification, the sheet is discharge facedown onto the stack tray 341, the processing advances to S1413.

At S1412 in a case where the orientation of the sheet at the time of passing within the verification module 109 matches with that at the time of the reference image registration, the registered reference image and the image read at S1408 as it is are compared. That is, the image obtained by reading the facing-up side of the conveyed sheet is compared with the image registered as the reference image of the obverse side and the image obtained by reading the facing-down side of the conveyed sheet is compared with the image registered as the reference image of the reverse side. In contrast to this, at S1413 in a case where the orientation of the sheet at the time of passing within the verification module 109 does not match with that at the time of the reference image registration, the reference image of the obverse side and the reference image of the reverse side are exchanged and comparison with the images read at S1408 is performed. That is, the image obtained by reading the facing-up side of the conveyed sheet is compared with the image registered as the reference image of the reverse side and the image obtained by reading the facing-down side of the conveyed sheet is compared with the image registered as the reference image of the obverse side. The item that is compared at S1412 and S1413 is in accordance with the verification level and the verification type set on the verification condition setting screen 900 described previously.

At next S1414, based on the results of the comparison processing using the reference image at S1412 or S1413, the processing is branched in accordance with whether the read image of the sheet is a normal image or a defective image.

Figure 17:
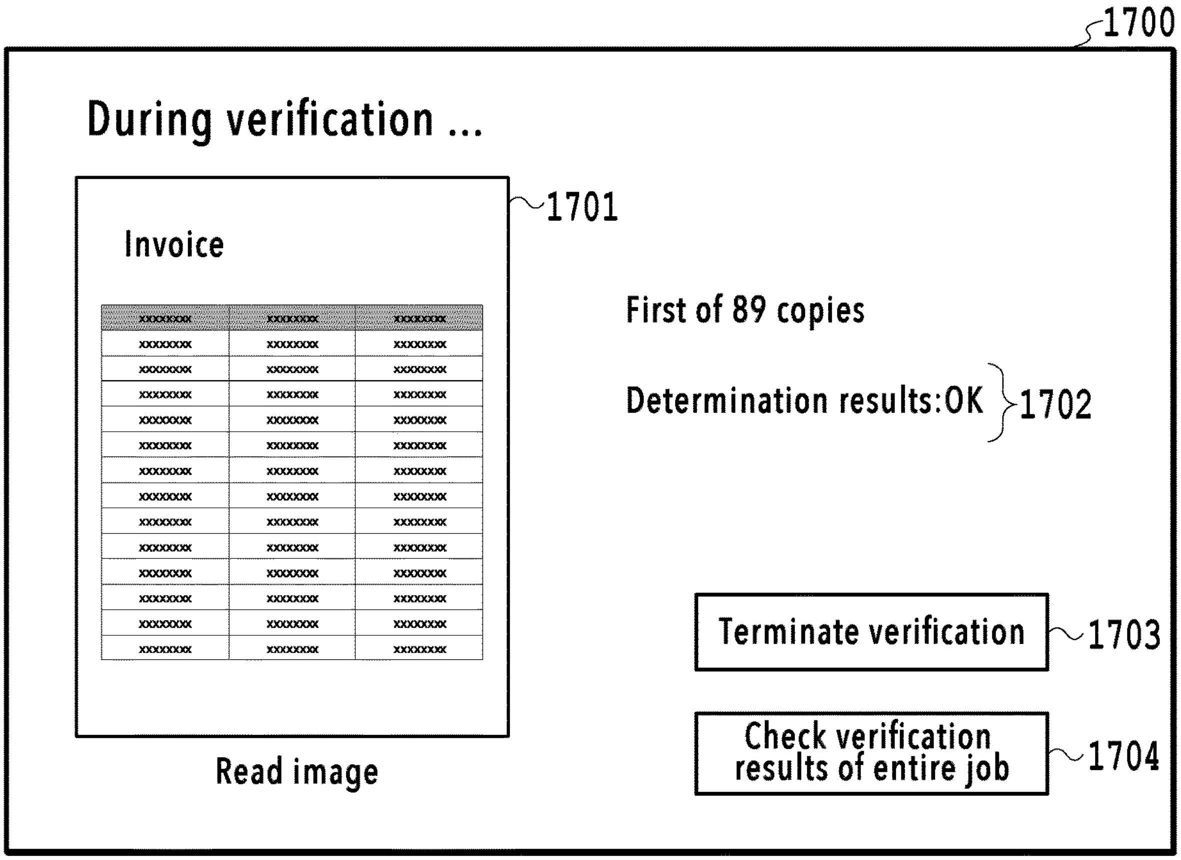
FIG. 17 is a diagram showing an example of a UI screen displaying verification results.

In a case where the read image of the sheet is determined to be a normal image (that is, verification results are OK), the processing advances to S1415 and a character string of "OK" indicating that there is no problem in the verification results is displayed in a results display area 1702 within the verification status screen 1700 shown in FIG. 17. The display of the verification results may be produced automatically or may be produced only in a case where the "Verification results check" button 406 within the verification menu screen 400 shown in FIG. 4 described previously is pressed down. It is possible to terminate the verification by pressing down the button 1703 within the verification status screen 1700. In a case where the button 1703 is pressed down, the verification module 109 terminates the verification processing and returns the display to the verification menu screen 400 in FIG. 4. Further, it is possible to display the results check screen 1000 shown in FIG. 10 described previously, on which it is possible to check the verification results of the entire verification job, by pressing down the button 1704 within the verification status screen 1700. After the verification results are displayed, the processing advances to S1416. At S1416, the verification module 109 instructs the printing module 107 to discharge the sheet onto the basic sheet discharge destination designated in the verification job. Then, onto the basic sheet discharge destination designated by the control of the printing module 107, the printed sheet for which the verification results are determined to be OK is discharged. After the sheet is discharged, the processing returns to S1405 and the processing is continued.

Figure 18:
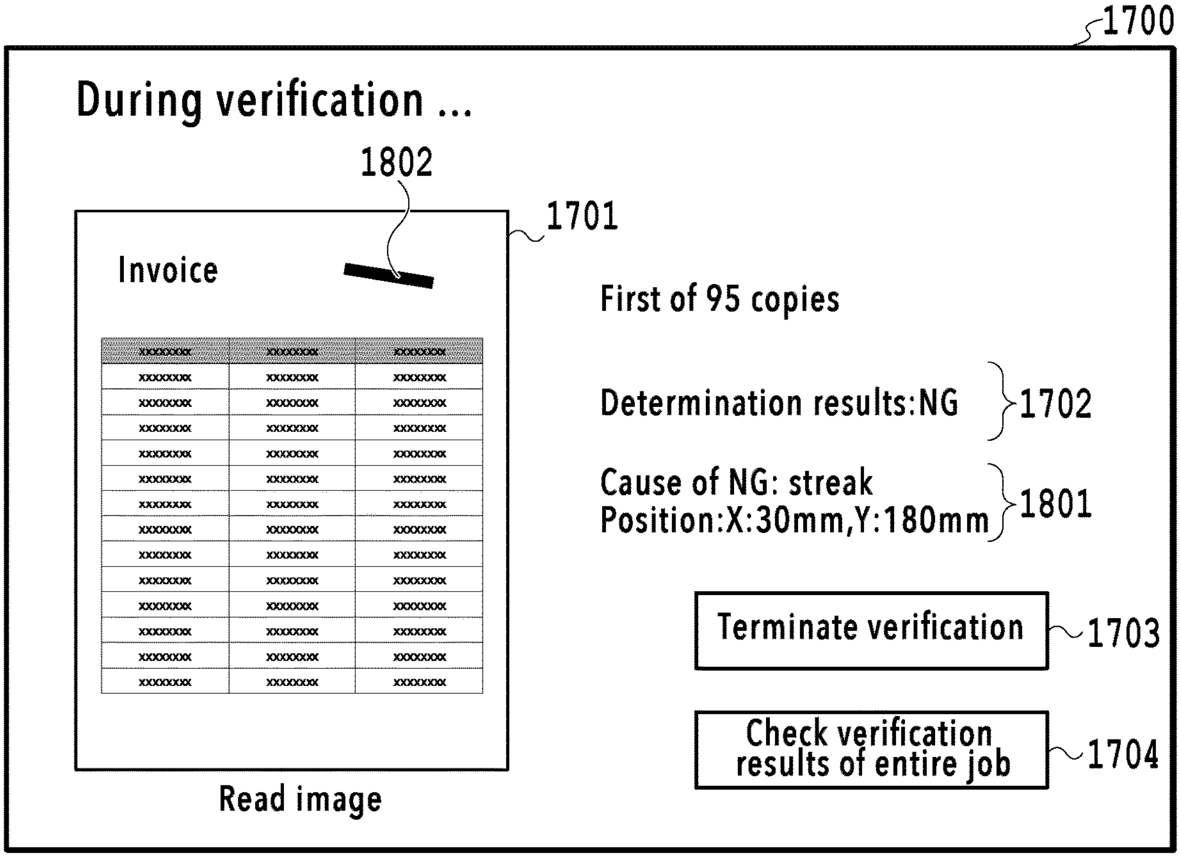
FIG. 18 is a diagram showing an example of the UI screen displaying verification results.

In a case where the read image of the sheet is determined to be a defective image (that is, verification results are NG), the processing advances to S1417 and a character string of "NG" indicating that there is a problem in the verification results is displayed in the results display area 1702 within the verification status screen 1700 (see FIG. 18). Further, in the example in FIG. 18, in addition to the character string display of "NG", information 1801 specifying the cause (here, "streak") by which the read image is determined to be a defective image and a mark 1802 indicating the position thereof are displayed. After the verification results are displayed, the processing advances to S1418. At S1418, the verification module 109 instructs the printing module 107 to discharge the sheet onto the sheet discharge destination in a case where the verification results are NG, which is designated in the verification job. Then, onto the sheet discharge destination in a case where the verification results are NG which is designated by the control of the printing module 107, the printed sheet for which the verification results are determined to be NG is discharged. After the sheet is discharged, the processing returns to S1405 and the processing is continued.

The above is the contents of the print processing accompanied by verification in the image forming apparatus 101 of the present embodiment. As described above, according to the present embodiment, the comparison between the read image of the sheet and the reference image is performed by taking into consideration both whether or not sheet reversion is performed and the sheet discharge side designated in the job at the sheet discharge destination designated in the job. Due to this, it is made possible to match the sheet side associated with the reference image and the verification-target side of the printed sheet with each other even in a case where the sheet discharge destination and the sheet discharge side at the time of the reference image registration are different from those at the time of print processing accompanied by verification. That is, it is possible for a user to save time and effort to register the reference image in accordance with the sheet discharge destination to be used also in a case where a variety of sheet discharge destinations of different kinds exist.

Modification Example 1

In the above-described embodiment, the verification condition setting is performed in the verification module 109 and the verification job generation is performed in the external controller 102, but a configuration may be accepted in which both are performed by one of the apparatuses. Further, a configuration may be accepted in which the verification condition setting and the verification job generation can be performed by the printing module 107, the client PC 103 and the like.

Modification Example 2

Further, in the above-described embodiment, the notification of the sheet discharge destination (S1403) is given in units of sheet and the determination of the orientation at the time of passing (S1409 to S1411) is performed in units of sheet based on the notification results, but this is not limited. For example, in a case where a plurality of sheet discharge destinations is selected in the verification job, it may also be possible to perform the same processing repeatedly by skipping the above-described notification and determination while the same sheet discharge destination continues and perform the above-described notification and generation anew at timing at which the sheet discharge destination is switched to another.

Modification Example 3

Further, in the above-described embodiment, the determination relating to the sheet discharge destination and the sheet discharge side (S1409 to S1411) is performed in the verification module 109, but it may also be possible for the external controller 102, the printing module 107, or the client PC 103 to perform the determination in place of the verification module 109. In this case, it is sufficient for the verification module 109 to receive the determination results from another apparatus and perform S1412 and the subsequent steps described above in accordance with the received determination results.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in the printing system capable of verifying a print defect of a printed sheet, it is possible to prevent inconsistency between the sheet side at the time of reference image registration and that at the time of verification processing from occurring without imposing complicated work on a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-111727, filed Jun. 29, 2020 which is hereby incorporated by reference herein in its entirety.

What is claimed is:

1. A printing system capable of verifying, based on a read image of a printed sheet for which print processing has been performed, a print defect in the printed sheet, the printing system comprising:

a reading unit configured to read an image on a sheet;

a registration unit configured to register an image on a sheet to be taken as a sample sheet read by the reading unit as a reference image in the verification;

a storage unit configured to store a sheet discharge setting for the sample sheet; and a verification unit configured to verify, using the reference image registered in the registration unit, an image on the printed sheet by acquiring a sheet discharge setting in the print processing and based on the acquired sheet discharge setting and a sheet discharge setting stored in the storage unit, wherein the registration unit registers the reference image in association with a sheet side indicating one of an obverse side and a reverse side, and the verification unit performs the verification by matching the sheet side associated with the reference image and a verification-target side of the printed sheet.

2. The printing system according to claim 1, wherein the verification unit performs the verification by taking the reference image registered in association with the obverse side as a reference image of the reverse side and the reference image registered in association with the reverse side as a reference image of the obverse side in a case where the verification-target side of the printed sheet does not match with the sheet side associated with the reference image.

3. The printing system according to claim 2, wherein the printing system has a plurality of sheet discharge destinations, and the sheet discharge setting includes at least information specifying a sheet discharge destination to be used among the plurality of sheet discharge destinations.

4. The printing system according to claim 3, further comprising:

a storage unit configured to store flag information indicating whether or not to perform reversion processing when a sheet is discharged for each of the plurality of sheet discharge destinations, wherein the verification unit performs the verification by determining whether the verification-target side of the printed sheet matches with the sheet side associated with the reference image based on the flag information on the sheet discharge destination specified by the sheet discharge setting as the sheet discharge destination to be used.

5. The printing system according to claim 3, wherein the printing system supporting a faceup in which a sheet is discharged with the obverse side of the sheet facing up and a facedown in which a sheet is discharged with the obverse side of the sheet facing down as a sheet discharge method, the sheet discharge setting further includes information on a sheet discharge side, which specifies one of the faceup and the facedown as an orientation of a sheet in a case where the sheet is discharged, and the verification unit performs the verification by determining whether the verification-target side of the printed sheet matches with the sheet side associated with the reference image based on the sheet discharge side specified by the sheet discharge setting.

6. The printing system according to claim 1, wherein the verification unit acquires the sheet discharge setting in the print processing in units of sheet.

7. The printing system according to claim 1, wherein the registration unit performs the registration in accordance with a first job giving instructions to register the reference image, which includes the sheet discharge setting of the sheet to be taken as the sample sheet, and in the first job, whether the registration is performed by generating the sample sheet by performing print processing for a sheet that is not printed or the registration is performed by taking in a printed sheet as the sample sheet is designated.

8. The printing system according to claim 7, wherein the sheet discharge setting in the print processing is included in a second job giving instructions to perform the print processing accompanied by the verification, and the verification unit performs the verification for a printed sheet in accordance with the second job.

9. A control method of a printing system capable of verifying, based on a read image of a printed sheet for which print processing has been performed, a print defect in the printed sheet, the control method comprising the steps of:

registering in advance an image on a sheet to be taken as the sample sheet read by an image reading unit as a reference image in the verification;

storing a sheet discharge setting for the sample sheet; and verifying, using the reference image registered at the registration step, an image on the printed sheet by acquiring a sheet discharge setting in the print processing and based on the acquired sheet discharge setting and a sheet discharge setting stored at the storage step, wherein at the registration step, the reference image is registered in association with a sheet side indicating one of an obverse side and a reverse side, and at the verification step, the verification is performed by matching the sheet side associated with the reference image and a verification-target side of the printed sheet.

10. A non-transitory computer readable storage medium storing a program for causing a computer to perform a control method of a printing system capable of verifying, based on a read image of a printed sheet for which print processing has been performed, a print defect in the printed sheet, the control method comprising the steps of:

registering in advance an image on a sheet to be taken as the sample sheet read by an image reading unit as a reference image in the verification;

storing a sheet discharge setting for the sample sheet; and verifying, using the reference image registered at the registration step, an image on the printed sheet by acquiring a sheet discharge setting in the print processing and based on the acquired sheet discharge setting and a sheet discharge setting stored at the storage step, wherein at the registration step, the reference image is registered in association with a sheet side indicating one of an obverse side and a reverse side, and at the verification step, the verification is performed by matching the sheet side associated with the reference image and a verification-target side of the printed sheet.

* * * * *